US010656380B2

(12) United States Patent
Chen

(10) Patent No.: US 10,656,380 B2
(45) Date of Patent: May 19, 2020

(54) OPTICAL IMAGING LENS ASSEMBLY, IMAGE CAPTURING UNIT AND ELECTRONIC DEVICE

(71) Applicant: LARGAN PRECISION CO., LTD., Taichung (TW)

(72) Inventor: Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 155 days.

(21) Appl. No.: 15/898,603

(22) Filed: Feb. 18, 2018

(65) Prior Publication Data
US 2019/0154974 A1   May 23, 2019

(30) Foreign Application Priority Data
Nov. 23, 2017 (TW) .............................. 106140782 A

(51) Int. Cl.
  *G02B 9/64*   (2006.01)
  *G02B 13/00*   (2006.01)
  *G02B 27/00*   (2006.01)
  *G02B 13/22*   (2006.01)
(52) U.S. Cl.
  CPC ........... *G02B 9/64* (2013.01); *G02B 13/0045* (2013.01); *G02B 27/0037* (2013.01); *G02B 13/22* (2013.01)

(58) Field of Classification Search
  CPC .......... G02B 9/64; G02B 5/005; G02B 5/208; G02B 7/04; G02B 13/0045; G02B 13/04; G02B 13/18
  See application file for complete search history.

(56) References Cited

U.S. PATENT DOCUMENTS

2017/0059825 A1\* 3/2017 Tang ................... G02B 13/0045

FOREIGN PATENT DOCUMENTS

| CN | 106291882 A | 1/2017 |
| CN | 106990510 A | 7/2017 |
| CN | 107015346 A | 8/2017 |

\* cited by examiner

*Primary Examiner* — Joseph P Martinez
*Assistant Examiner* — Vipin Patel
(74) *Attorney, Agent, or Firm* — Maschoff Brennan

(57) ABSTRACT

An optical imaging lens assembly includes seven lens elements which are, in order from an object side to an image side: a first lens element, a second lens element, a third lens element, a fourth lens element, a fifth lens element, a sixth lens element and a seventh lens element. The seventh lens element has an image-side surface being concave in a paraxial region thereof. At least one of an object-side surface and the image-side surface of the seventh lens element has at least one critical point in an off-axis region thereof. The object-side surface and the image-side surface of the seventh lens element are both aspheric.

22 Claims, 21 Drawing Sheets

OPTICAL IMAGING LENS ASSEMBLY, IMAGE CAPTURING UNIT AND ELECTRONIC DEVICE

RELATED APPLICATIONS

This application claims priority to Taiwan Application 106140782, filed on Nov. 23, 2017, which is incorporated by reference herein in its entirety.

BACKGROUND

Technical Field

The present disclosure relates to an optical imaging lens assembly, an image capturing unit and an electronic device, more particularly to an optical imaging lens assembly and an image capturing unit applicable to an electronic device.

Description of Related Art

In recent years, with the popularity of electronic devices having camera functionalities, the demand for miniaturized optical systems has been increasing.

As advanced semiconductor manufacturing technologies have reduced the pixel size of image sensors, and compact optical systems have gradually evolved toward the field of higher megapixels, there is an increasing demand for compact optical systems featuring better image quality.

For various applications, the optical systems have been widely applied to different kinds of electronic devices, such as vehicle devices, image recognition systems, entertainment devices, sport devices and intelligent home systems.

Furthermore, in order to provide better user experience, electronic devices equipped with one or more optical systems have become the mainstream products on the market, and the optical systems are developed with various optical features according to different requirements.

As the size of electronic devices getting smaller and smaller, it is difficult for conventional optical systems to meet the requirements of high-end specification and compact size, especially requirements such as a large aperture or a wide field of view. Generally, in order to achieve compactness, a first lens element of a miniaturized optical system usually has positive refractive power, and a second lens element usually has negative refractive power. However, it is difficult for light from a large field of view to travel into the miniaturized optical system due to strong positive refractive power of the first lens element, thereby failing to achieve a configuration with a wide view angle.

On the other hand, a conventional wide-angle optical system usually has a first lens element with negative refractive power for gathering light from the large field of view. However, the total track length of the wide-angle optical system increases due to the negative refractive power of the first lens element, thereby it is unable to achieve compactness. Moreover, compressing the total track length or enlarging the aperture stop of the wide-angle optical system may lead to poor image quality, especially at the periphery of the image.

SUMMARY

According to one aspect of the present disclosure, an optical imaging lens assembly includes seven lens elements. The seven lens elements are, in order from an object side to an image side, a first lens element, a second lens element, a third lens element, a fourth lens element, a fifth lens element, a sixth lens element and a seventh lens element. The seventh lens element has an image-side surface being concave in a paraxial region thereof. At least one of an object-side surface and the image-side surface of the seventh lens element has at least one critical point in an off-axis region thereof. The object-side surface and the image-side surface of the seventh lens element are both aspheric. When an axial distance between an object-side surface of the first lens element and the image-side surface of the seventh lens element is Td, a maximum effective radius of the image-side surface of the seventh lens element is Y72, a vertical distance from an optical axis to an intersection point of the image-side surface of the seventh lens element and a chief ray with an incident angle of 55 degrees relative to the optical axis is Yc_55, and a maximum image height of the optical imaging lens assembly is ImgH, the following conditions are satisfied:

$Td/|Y72|<1.80$; and $0.30<|Yc\_55|/ImgH<0.95$.

According to another aspect of the present disclosure, an image capturing unit includes the aforementioned optical imaging lens assembly and an image sensor, wherein the image sensor is disposed on an image surface of the optical imaging lens assembly.

According to still another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

An optical imaging lens assembly includes seven lens elements. The seven lens elements are, in order from an object side to an image side, a first lens element, a second lens element, a third lens element, a fourth lens element, a fifth lens element, a sixth lens element and a seventh lens element.

The first lens element can have negative refractive power. Therefore, it is favorable for providing a wide-angle lens configuration to gather light from a large field of view.

The fourth lens element can have negative refractive power. Therefore, it is favorable for light to travel into the optical imaging lens assembly so as to increase relative illuminance on the image surface and prevent stray light from being generated due to surface reflection.

The fifth lens element can have an image-side surface being convex in a paraxial region thereof. Therefore, it is favorable for light to travel into the optical imaging lens assembly so as to increase relative illuminance on the image surface and prevent stray light from being generated due to surface reflection.

The sixth lens element can be meniscus in a paraxial region thereof. Therefore, adjusting both the shape and the refractive power of the sixth lens element is favorable for increasing the design flexibility of the optical imaging lens assembly. A lens element is meniscus in a paraxial region thereof indicates that an object-side surface and an image-side surface of the lens element are respectively convex and concave in a paraxial region thereof, or concave and convex in a paraxial region thereof.

Figure 19:
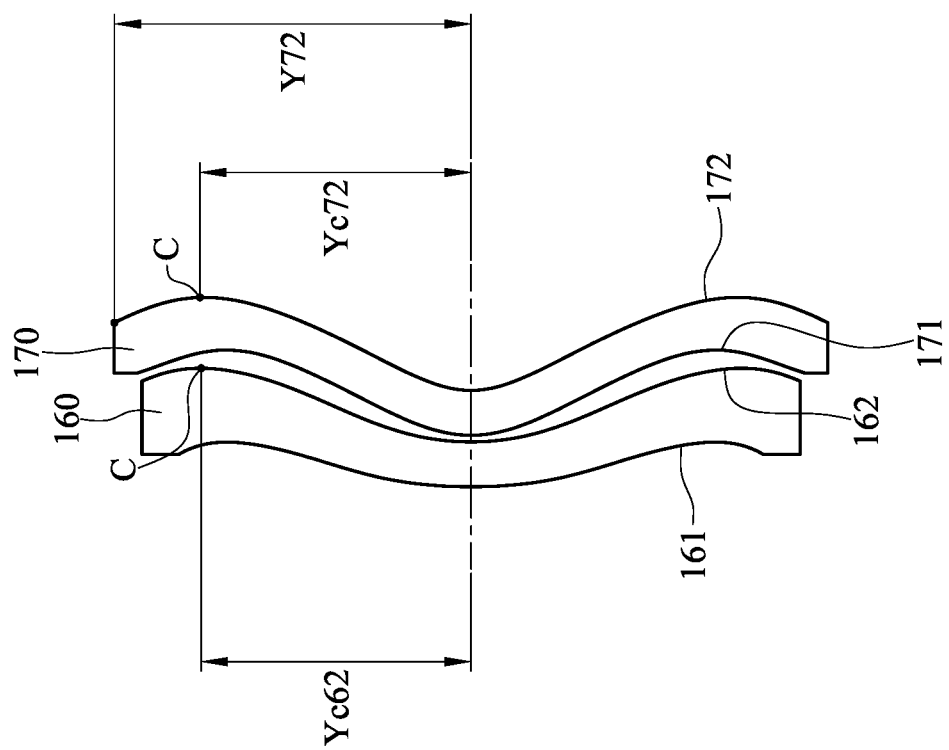
FIG. 19 shows a schematic view of Yc62, Yc72, Y72 and convex critical points of the sixth lens element and the seventh lens element, according to the 1st embodiment of the present disclosure.

The seventh lens element can have negative refractive power, and the seventh lens element can have an object-side surface being convex in a paraxial region thereof; therefore, adjusting both the shape and the refractive power of the seventh lens element is favorable for preventing image correction problems due to large differences among the refractive power of lens elements on the image side of the optical imaging lens assembly. The seventh lens element has an image-side surface being concave in a paraxial region thereof; therefore, it is favorable for correcting off-axis aberrations and increasing illuminance on the image surface. At least one of the object-side surface and the image-side surface of the seventh lens element has at least one critical point in an off-axis region thereof; therefore, it is favorable for correcting the Petzval sum so as to flatten the image surface while correcting off-axis aberrations. More specifically, the image-side surface of the seventh lens element can have at least one convex critical point; therefore, the convex critical point is favorable for preventing the periphery of the seventh lens element from overly close to the image surface; moreover, when the convex critical point configured with a concave shape in a paraxial region on the image-side surface of the seventh lens element, it is favorable for reducing a back focal length between the lens elements and the image surface so as to be favorable for the miniaturization of the optical imaging lens assembly and a camera module including the optical imaging lens assembly. Please refer to FIG. 19, which shows a schematic view of a convex critical point C of the seventh lens element according to the 1st embodiment of the present disclosure.

When an axial distance between an object-side surface of the first lens element and the image-side surface of the seventh lens element is Td, and a maximum effective radius of the image-side surface of the seventh lens element is Y72, the following condition is satisfied: Td/|Y72|<1.80. Therefore, it is favorable for reducing a total track length so as to minimize the size of the optical imaging lens assembly. Preferably, the following condition can also be satisfied: 1.0<Td/|Y72|<1.60. Please refer to FIG. 19, which shows a schematic view of Y72 according to the 1st embodiment of the present disclosure.

Figure 20:
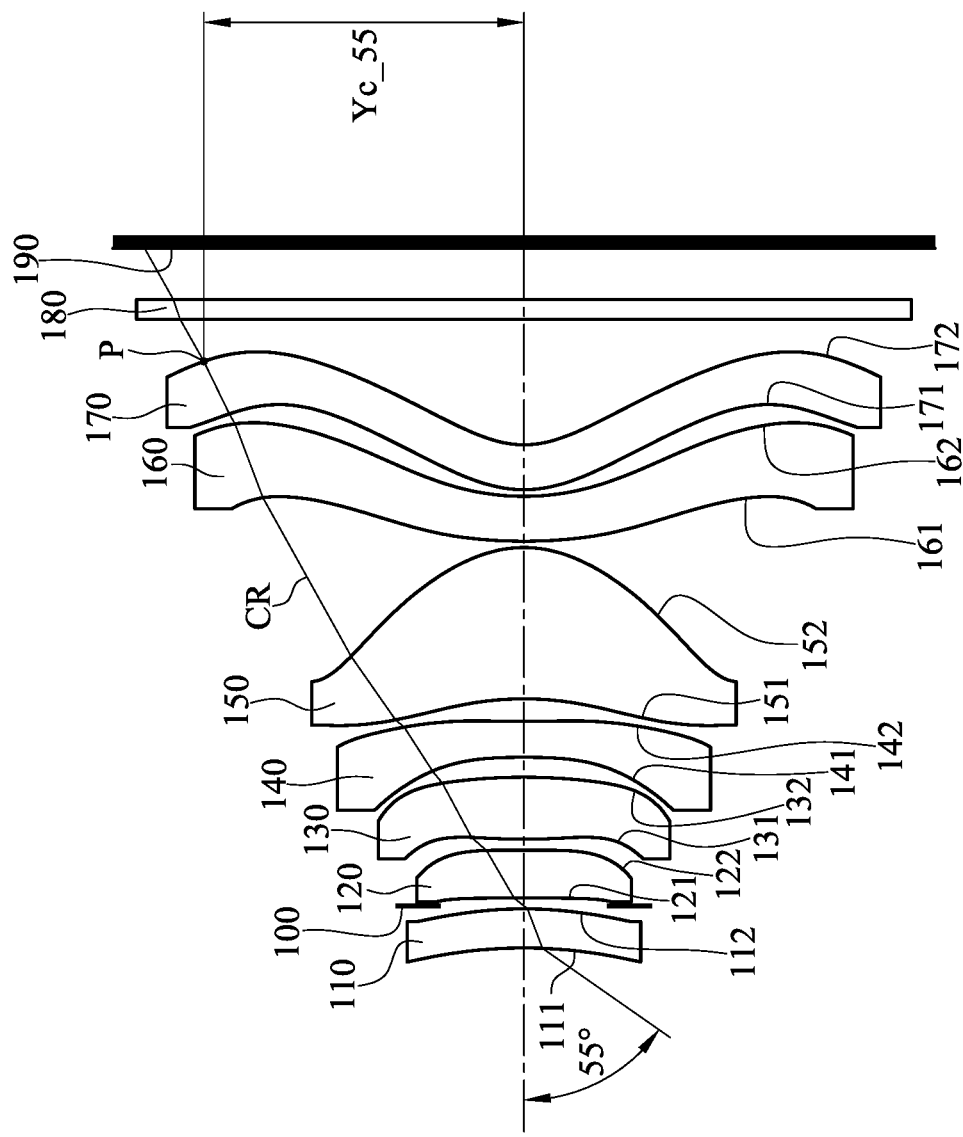
FIG. 20 shows a schematic view of Yc_55 according to the 1st embodiment of the present disclosure.

When a vertical distance from an optical axis to an intersection point of the image-side surface of the seventh lens element and a chief ray with an incident angle of 55 degrees relative to the optical axis is Yc_55, and a maximum image height of the optical imaging lens assembly (half of a diagonal length of an effective photosensitive area of an image sensor) is ImgH, the following condition is satisfied: 0.30<|Yc_55|/ImgH<0.95. Therefore, it is favorable for providing a wide-angle lens configuration so as to achieve a wide angle effect. Please refer to FIG. 20, which shows a schematic view of Yc_55 according to the 1st embodiment of the present disclosure, wherein the incident angle of a chief ray CR is 55 degrees relative to the optical axis, and the chief ray CR has an intersection point P with the image-side surface of the seventh lens element. A vertical distance from the optical axis to the intersection point P is Yc_55.

When an axial distance between the object-side surface of the first lens element and an image surface is TL, and the maximum image height of the optical imaging lens assembly is ImgH, the following condition can be satisfied: TL/ImgH<2.0. Therefore, it is favorable for reducing the back focal length so as to miniaturize the optical imaging lens assembly in the camera module.

When a maximum field of view of the optical imaging lens assembly is FOV, the following condition can be satisfied: 110 [deg.]<FOV<220 [deg.]. Therefore, it is favorable for achieving a wide angle effect.

When an f-number of the optical imaging lens assembly is Fno, the following condition can be satisfied: 1.0<Fno<2.40. Therefore, it is favorable for providing a large aperture stop so as to capture sufficient image data in lowlight (e.g., night-time) or short exposure (e.g., dynamic photography) conditions; furthermore, it is favorable for increasing imaging speed so as to achieve high image quality in a well-lit condition. Preferably, the following condition can also be satisfied: 1.40<Fno<2.05.

Figure 21:
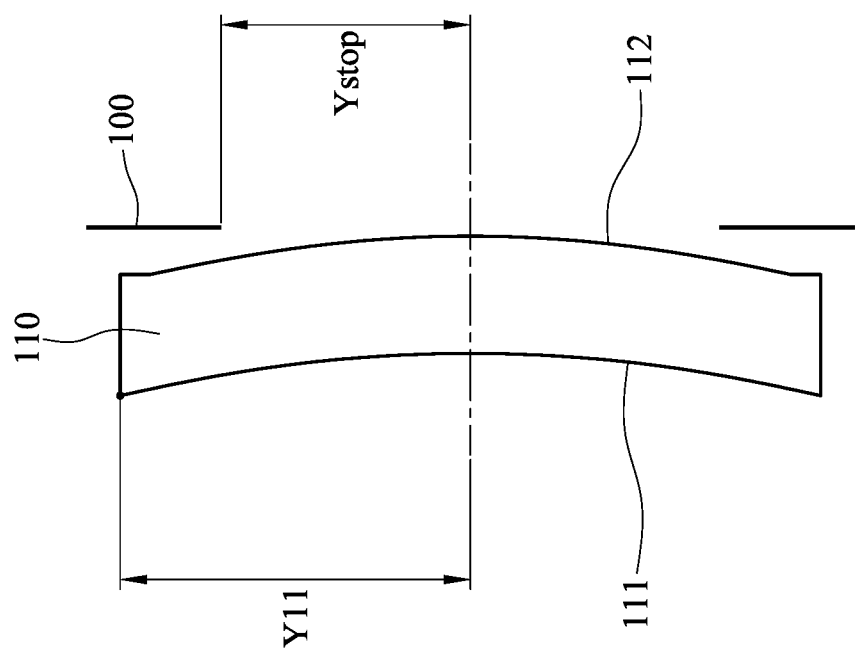
FIG. 21 shows a schematic view of Y11 and Ystop according to the 1st embodiment of the present disclosure.

When a maximum effective radius of the object-side surface of the first lens element is Y11, and the maximum effective radius of the image-side surface of the seventh lens element is Y72, the following condition can be satisfied: |Y11/Y72|<1.20. Therefore, maintaining a proper configuration of effective photosensitive areas on the object side and on the image side of the optical imaging lens assembly is favorable for the miniaturization of the optical imaging lens assembly having a large aperture stop. Preferably, the following condition can also be satisfied: |Y11/Y72|<0.90. Please refer to FIG. 21, which shows a schematic view of Y11 according to the 1st embodiment of the present disclosure.

When a focal length of the optical imaging lens assembly is f, a focal length of the first lens element is f1, and a focal length of the second lens element is f2, the following condition can be satisfied: |f/f1|+|f/f2|<0.70. Therefore, it is favorable for preventing overly large refraction angles due to overly strong refractive power of the first lens element and the second lens element; furthermore, it is favorable for providing a wide angle configuration. Preferably, the following condition can also be satisfied: |f/f1|+|f/f2|<0.45.

When a curvature radius of the object-side surface of the first lens element is R1, a curvature radius of an image-side surface of the first lens element is R2, a curvature radius of an object-side surface of the second lens element is R3, a curvature radius of an image-side surface of the second lens element is R4, a curvature radius of an object-side surface of the third lens element is R5, a curvature radius of an image-side surface of the third lens element is R6, a curvature radius of an object-side surface of the fourth lens element is R7, a curvature radius of an image-side surface of the fourth lens element is R8, a curvature radius of an object-side surface of the fifth lens element is R9, a curvature radius of the image-side surface of the fifth lens element is R10, a curvature radius of an object-side surface of the sixth lens element is R11, a curvature radius of an image-side surface of the sixth lens element is R12, a curvature radius of the object-side surface of the seventh lens element is R13, and a curvature radius of the image-side surface of the seventh lens element is R14, the following conditions can be satisfied: |R14/R1|<1.0; |R14/R2|<1.0; |R14/R3|<1.0; |R14/R4|<1.0; |R14/R5|<1.0; |R14/R6|<1.0; |R14/R7|<1.0; |R14/R8|<1.0; |R14/R9|<1.0; |R14/R10|<1.0; |R14/R11|<1.0; |R14/R12|<1.0; and |R14/R13|<1.0. In other words, an absolute value of the ratio of the curvature radius of the image-side surface of the seventh lens element to the curvature radius of every other surface of the seven lens elements is smaller than 1.0. Therefore, it is favorable for enhancing the characteristics of the concave shape in a paraxial region of the image-side surface of the seventh lens element so as to reduce the back focal length of the optical imaging lens assembly.

When a vertical distance between a convex critical point closest to a maximum effective radius position on the image-side surface of the sixth lens element and the optical axis is Yc62, and a vertical distance between a convex critical point closest to a maximum effective radius position on the image-side surface of the seventh lens element and the optical axis is Yc72, the following condition can be satisfied: 0.50<|Yc62/Yc72|<1.5. Therefore, it is favorable for having a convex critical point in an off-axis region on the image-side surface of the seventh lens element so as to further correct off-axis aberrations. Please refer to FIG. 19, which shows a schematic view of Yc62, Yc72 and convex critical points C of the sixth lens element and the seventh lens element, according to the 1st embodiment of the present disclosure. When the image-side surface of the sixth lens element or the image-side surface of the seventh lens element has a single convex critical point located on the optical axis, Yc62 or Yc72 is equal to 0, respectively.

According to the present disclosure, the optical imaging lens assembly can include an aperture stop located between an imaged object and the object-side surface of the third lens element. Therefore, the positioning of the aperture stop is favorable for obtaining a balance between the field of view and the total track length so as to miniaturize the optical imaging lens assembly, thereby becoming applicable to a wide range of applications.

When the number of lens elements having an Abbe number smaller than 20 among the first through the seventh lens elements is V20, the following condition can be satisfied: 2≤V20. Therefore, it is favorable for correcting chromatic aberration so as to improve the image quality at the periphery of the image.

When the focal length of the optical imaging lens assembly is f, and the curvature radius of the image-side surface of the sixth lens element is R12, the following condition can be satisfied: 0≤f/R12. Therefore, adjusting both the shape and the refractive power of the sixth lens element is favorable for improving the design flexibility of the optical imaging lens assembly.

When the maximum effective radius of the image-side surface of the seventh lens element is Y72, and the focal length of the optical imaging lens assembly is f, the following condition can be satisfied: 1.0<|Y72|/f. Therefore, it is favorable for reducing the back focal length so as to miniaturize the optical imaging lens assembly in the camera module.

When the maximum effective radius of the object-side surface of the first lens element is Y11, and an aperture radius of the aperture stop is Ystop, the following condition can be satisfied: |Y11/Ystop|<2.0. Therefore, it is favorable for reducing the effective radius of the first lens element so as to maintain a compact size of the camera module.

When the curvature radius of the image-side surface of the seventh lens element is R14, and the maximum effective radius of the image-side surface of the seventh lens element is Y72, the following condition can be satisfied: 0<R14/|Y72|<0.50. Therefore, it is favorable for enhancing the characteristic of a concave shape in a paraxial region on the image-side surface of the seventh lens element so as to move the exit pupil towards the object side of the optical imaging lens assembly, such that it is favorable for reducing an incident angle of light forming the image periphery, thereby improving the illumination of the image surface.

According to the present disclosure, the aforementioned features and conditions can be utilized in numerous combinations so as to achieve corresponding effects.

According to the present disclosure, the lens elements of the optical imaging lens assembly can be made of either glass or plastic material. When the lens elements are made of glass material, the refractive power distribution of the optical imaging lens assembly may be more flexible. The glass lens element can either be made by grinding or molding. When the lens elements are made of plastic material, the manufacturing cost can be effectively reduced. Furthermore, surfaces of each lens element can be arranged to be aspheric, which allows for more controllable variables for eliminating aberrations thereof, the required number of the lens elements can be reduced, and the total track length of the optical imaging lens assembly can be effectively shortened. The aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise specified, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, a critical point is a non-axial point of the lens surface where its tangent is perpendicular to the optical axis.

According to the present disclosure, an image surface of the optical imaging lens assembly, based on the corresponding image sensor, can be flat or curved, especially a curved surface being concave facing towards the object side of the optical imaging lens assembly.

According to the present disclosure, an image correction unit, such as a field flattener, can be optionally disposed between the lens element closest to the image side of the optical imaging lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the specification of an image capturing unit. In general, a preferable image correction unit is, for example, a thin transparent element having a concave object-side surface and a planar image-side surface, and the thin transparent element is disposed near the image surface.

According to the present disclosure, the optical imaging lens assembly can include at least one stop, such as an aperture stop, a glare stop or a field stop. Said glare stop or said field stop is set for eliminating the stray light and thereby improving the image quality thereof.

According to the present disclosure, an aperture stop can be configured as a front stop or a middle stop. A front stop disposed between an imaged object and the first lens element can provide a longer distance between an exit pupil of the optical imaging lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the optical imaging lens assembly and thereby provides a wider field of view for the same.

According to the above description of the present disclosure, the following specific embodiments are provided for further explanation.

1st Embodiment

Figure 1:
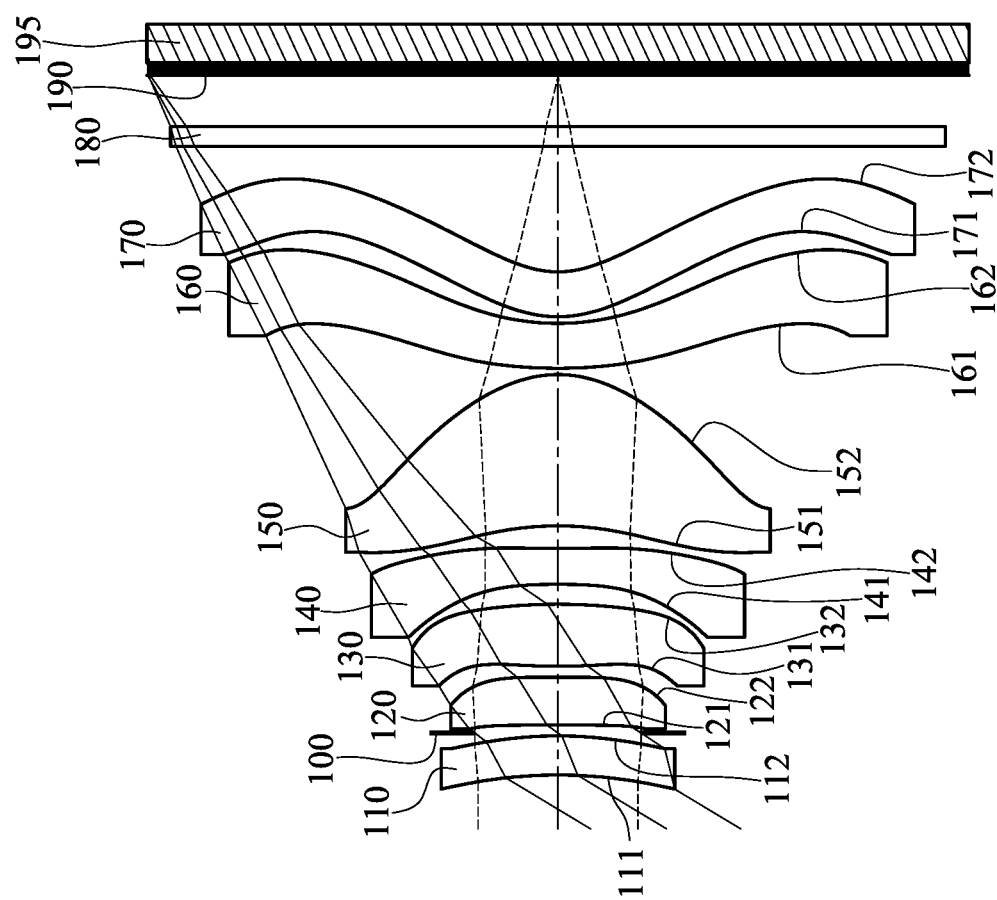
FIG. 1 is a schematic view of an image capturing unit according to the 1st embodiment of the present disclosure.
Figure 2:
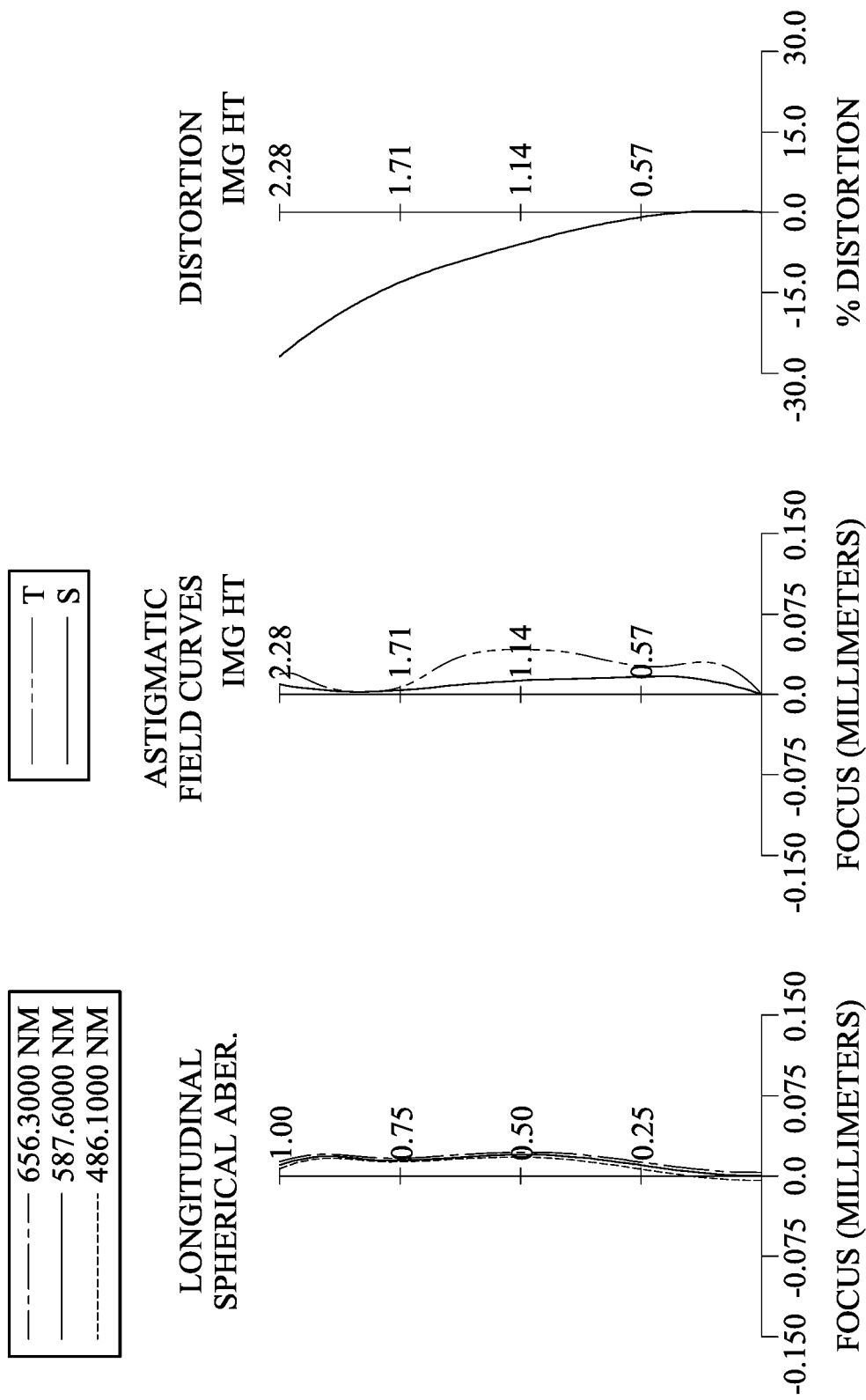
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical imaging lens assembly (its reference numeral is omitted) of the present disclosure and an image sensor 195. The optical imaging lens assembly includes, in order from an object side to an image side, a first lens element 110, an aperture stop 100, a second lens element 120, a third lens element 130, a fourth lens element 140, a fifth lens element 150, a sixth lens element 160, a seventh lens element 170, an IR-cut filter 180 and an image surface 190. The optical imaging lens assembly includes seven lens elements (110, 120, 130, 140, 150, 160 and 170) with no additional lens element disposed between each of the adjacent seven lens elements.

The first lens element 110 with positive refractive power has an object-side surface 111 being concave in a paraxial region thereof and an image-side surface 112 being convex in a paraxial region thereof. The first lens element 110 is made of glass material and has the object-side surface 111 and the image-side surface 112 being both aspheric.

The second lens element 120 with negative refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of plastic material and has the object-side surface 131 and the image-side surface 132 being both aspheric.

The fourth lens element 140 with negative refractive power has an object-side surface 141 being concave in a paraxial region thereof and an image-side surface 142 being concave in a paraxial region thereof. The fourth lens element 140 is made of plastic material and has the object-side surface 141 and the image-side surface 142 being both aspheric.

The fifth lens element 150 with positive refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric.

The sixth lens element 160 with negative refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric.

The seventh lens element 170 with negative refractive power has an object-side surface 171 being convex in a paraxial region thereof and an image-side surface 172 being concave in a paraxial region thereof. The seventh lens element 170 is made of plastic material and has the object-side surface 171 and the image-side surface 172 being both aspheric. Each of the object-side surface 171 and the image-side surface 172 of the seventh lens element 170 has at least one critical point in an off-axis region thereof.

The IR-cut filter 180 is made of glass material and located between the seventh lens element 170 and the image surface 190, and will not affect the focal length of the optical imaging lens assembly. The image sensor 195 is disposed on or near the image surface 190 of the optical imaging lens assembly.

The equation of the aspheric surface profiles of the aforementioned lens elements of the 1st embodiment is expressed as follows:

$$X(Y) = (Y^2/R)/\left(1 + sqrt\left(1 - (1+k) \times (Y/R)^2\right)\right) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the optical imaging lens assembly of the image capturing unit according to the 1st embodiment, when a focal length of the optical imaging lens assembly is f, an f-number of the optical imaging lens assembly is Fno, and half of a maximum field of view of the optical imaging lens assembly is HFOV, these parameters have the following values: f=1.91 millimeters (mm), Fno=2.15, HFOV=59.0 degrees (deg.).

When the maximum field of view of the optical imaging lens assembly is FOV, the following condition is satisfied: FOV=118.0 [deg.].

When the number of lens elements having an Abbe number smaller than 20 among the first through the seventh lens elements is V20, the following condition is satisfied: V20=3.

When an axial distance between the object-side surface 111 of the first lens element 110 and the image surface 190 is TL, and a maximum image height of the optical imaging lens assembly is ImgH, the following condition is satisfied: TL/ImgH=1.71.

When an axial distance between the object-side surface 111 of the first lens element 110 and the image-side surface 172 of the seventh lens element 170 is Td, and a maximum effective radius of the image-side surface 172 of the seventh lens element 170 is Y72, the following condition is satisfied: Td/|Y72|=1.41.

When a maximum effective radius of the object-side surface 111 of the first lens element 110 is Y11, and the maximum effective radius of the image-side surface 172 of the seventh lens element 170 is Y72, the following condition is satisfied: |Y11/Y72|=0.33.

When the maximum effective radius of the object-side surface 111 of the first lens element 110 is Y11, and an aperture radius of the aperture stop 100 is Ystop, the following condition is satisfied: |Y11/Ystop|=1.40.

When the maximum effective radius of the image-side surface 172 of the seventh lens element 170 is Y72, and the focal length of the optical imaging lens assembly is f, the following condition is satisfied: |Y72|/f=1.04.

When a vertical distance between a convex critical point closest to a maximum effective radius position on the image-side surface 162 of the sixth lens element 160 and an optical axis is Yc62, and a vertical distance between a convex critical point closest to a maximum effective radius position on the image-side surface 172 of the seventh lens element 170 and the optical axis is Yc72, the following condition is satisfied: |Yc62/Yc72|=1.01.

When a vertical distance from the optical axis to an intersection point of the image-side surface 172 of the seventh lens element 170 and a chief ray with an incident angle of 55 degrees relative to the optical axis is Yc_55, and the maximum image height of the optical imaging lens assembly is ImgH, the following condition is satisfied: |Yc_55|/ImgH=0.78.

When a curvature radius of the object-side surface 111 of the first lens element 110 is R1, a curvature radius of the image-side surface 112 of the first lens element 110 is R2, a curvature radius of the object-side surface 121 of the second lens element 120 is R3, a curvature radius of the image-side surface 122 of the second lens element 120 is R4, a curvature radius of the object-side surface 131 of the third lens element 130 is R5, a curvature radius of the image-side surface 132 of the third lens element 130 is R6, a curvature radius of the object-side surface 141 of the fourth lens element 140 is R7, a curvature radius of the image-side surface 142 of the fourth lens element 140 is R8, a curvature radius of the object-side surface 151 of the fifth lens element 150 is R9, a curvature radius of the image-side surface 152 of the fifth lens element 150 is R10, a curvature radius of the object-side surface 161 of the sixth lens element 160 is R11, a curvature radius of the image-side surface 162 of the sixth lens element 160 is R12, a curvature radius of the object-side surface 171 of the seventh lens element 170 is R13, a curvature radius of the image-side surface 172 of the seventh lens element 170 is R14, the following conditions are satisfied: |R14/R1|=0.19; |R14/R2|=0.22; |R14/R3|=0.0017; |R14/R4|=0.02; |R14/R5|=0.18; |R14/R6|=0.16; |R14/R7|=0.12; |R14/R8|=0.09; |R14/R9|=0.30; |R14/R10|=0.79; |R14/R11|=0.18; |R14/R12|=0.37; and |R14/R13|=0.77.

When the curvature radius of the image-side surface 172 of the seventh lens element 170 is R14, and the maximum effective radius of the image-side surface 172 of the seventh lens element 170 is Y72, the following condition is satisfied: R14/|Y72|=0.26.

When the focal length of the optical imaging lens assembly is f, and the curvature radius of the image-side surface 162 of the sixth lens element 160 is R12, the following condition is satisfied: f/R12=1.38.

When the focal length of the optical imaging lens assembly is f, a focal length of the first lens element 110 is f1, and a focal length of the second lens element 120 is f2, the following condition is satisfied: |f/f1|+|f/f2|=0.21.

The detailed optical data of the 1st embodiment are shown in Table 1 and the aspheric surface data are shown in Table 2 below.

TABLE 1

1st Embodiment
f = 1.91 mm, Fno = 2.15, HFOV = 59.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.691 | (ASP) | 0.218 | Glass | 2.144 | 17.8 | 10.80 |
| 2 | | −2.305 | (ASP) | 0.016 | | | | |
| 3 | Ape. Stop | Plano | | 0.044 | | | | |
| 4 | Lens 2 | 308.780 | (ASP) | 0.267 | Plastic | 1.544 | 55.9 | −57.47 |
| 5 | | 28.365 | (ASP) | 0.061 | | | | |
| 6 | Lens 3 | 2.876 | (ASP) | 0.346 | Plastic | 1.544 | 55.9 | 2.84 |
| 7 | | −3.186 | (ASP) | 0.111 | | | | |
| 8 | Lens 4 | −4.248 | (ASP) | 0.200 | Plastic | 1.669 | 19.5 | −3.63 |
| 9 | | 5.790 | (ASP) | 0.126 | | | | |
| 10 | Lens 5 | −1.742 | (ASP) | 0.844 | Plastic | 1.544 | 55.9 | 1.52 |
| 11 | | −0.656 | (ASP) | 0.035 | | | | |
| 12 | Lens 6 | 2.798 | (ASP) | 0.250 | Plastic | 1.669 | 19.5 | −4.40 |
| 13 | | 1.383 | (ASP) | 0.037 | | | | |
| 14 | Lens 7 | 0.671 | (ASP) | 0.250 | Plastic | 1.544 | 55.9 | −9.34 |
| 15 | | 0.515 | (ASP) | 0.700 | | | | |
| 16 | IR-cut filter | Plano | | 0.110 | Glass | 1.517 | 64.2 | — |
| 17 | | Plano | | 0.286 | | | | |
| 18 | Image | Plano | | — | | | | |

Note:
Reference wavelength is 587.6 nm (d-line).

TABLE 2

Aspheric Coefficients

| Surface # | 1 | 2 | 4 | 5 | 6 |
|---|---|---|---|---|---|
| k= | −1.4448E+00 | −8.0405E+00 | −9.0000E+01 | 2.0000E+01 | −2.1418E+01 |
| A4= | −2.3636E−02 | −4.7006E−02 | −2.5668E−01 | −1.0193E+00 | −4.4016E−01 |
| A6= | −1.8841E−02 | 8.7654E−02 | 2.7268E−01 | −8.7515E−01 | −1.2339E+00 |
| A8= | 2.2536E−01 | −2.9638E−02 | −2.2951E+00 | 2.0434E+00 | 7.4940E−01 |
| A10= | −1.4957E−01 | 9.8025E−02 | −3.7977E+00 | −4.4659E+00 | −3.9320E+00 |
| A12= | — | — | — | — | 7.8012E+00 |

| Surface # | 7 | 8 | 9 | 10 | 11 |
|---|---|---|---|---|---|
| k= | −4.2009E+01 | 1.0558E+01 | −3.5117E+01 | −1.4745E+01 | −1.9189E+00 |
| A4= | −1.4138E−01 | −9.5529E−01 | −7.3912E−01 | −3.6296E−01 | −1.1895E−01 |
| A6= | 3.1113E−01 | 1.4373E+00 | 1.5783E+00 | 1.0847E+00 | −9.0242E−02 |
| A8= | −1.8077E+00 | −1.4897E+00 | −2.2541E+00 | −1.2539E+00 | 3.1575E−01 |
| A10= | 1.9438E+00 | 1.2740E+00 | 2.1406E+00 | 7.5463E−01 | −6.0334E−01 |
| A12= | −1.2493E+00 | −1.0550E+00 | −1.2093E+00 | −2.2478E−01 | 6.5194E−01 |
| A14= | — | 4.6620E−01 | 3.1084E−01 | 2.4886E−02 | −2.9335E−01 |
| A16= | — | — | −2.0218E−02 | — | 4.4743E−02 |

| Surface # | 12 | 13 | 14 | 15 |
|---|---|---|---|---|
| k= | −6.8796E+01 | −3.5719E+00 | −1.9269E+00 | −2.9538E+00 |
| A4= | 3.9817E−01 | 1.8517E−01 | −3.1011E−01 | −1.7219E−01 |
| A6= | −5.3918E−01 | −3.2718E−01 | 2.8735E−01 | 1.3242E−01 |
| A8= | 3.4973E−01 | 2.2479E−01 | −1.7575E−01 | −6.6951E−02 |
| A10= | −1.2636E−01 | −8.5932E−02 | 5.8107E−02 | 1.8025E−02 |
| A12= | 2.3733E−02 | 1.8484E−02 | −1.0207E−02 | −2.5533E−03 |
| A14= | −1.9241E−03 | −2.0801E−03 | 9.0122E−04 | 1.7769E−04 |
| A16= | 2.9235E−05 | 9.5006E−05 | −3.1449E−05 | −4.7505E−06 |

In Table 1, the curvature radius, the thickness and the focal length are shown in millimeters (mm). Surface numbers 0-18 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
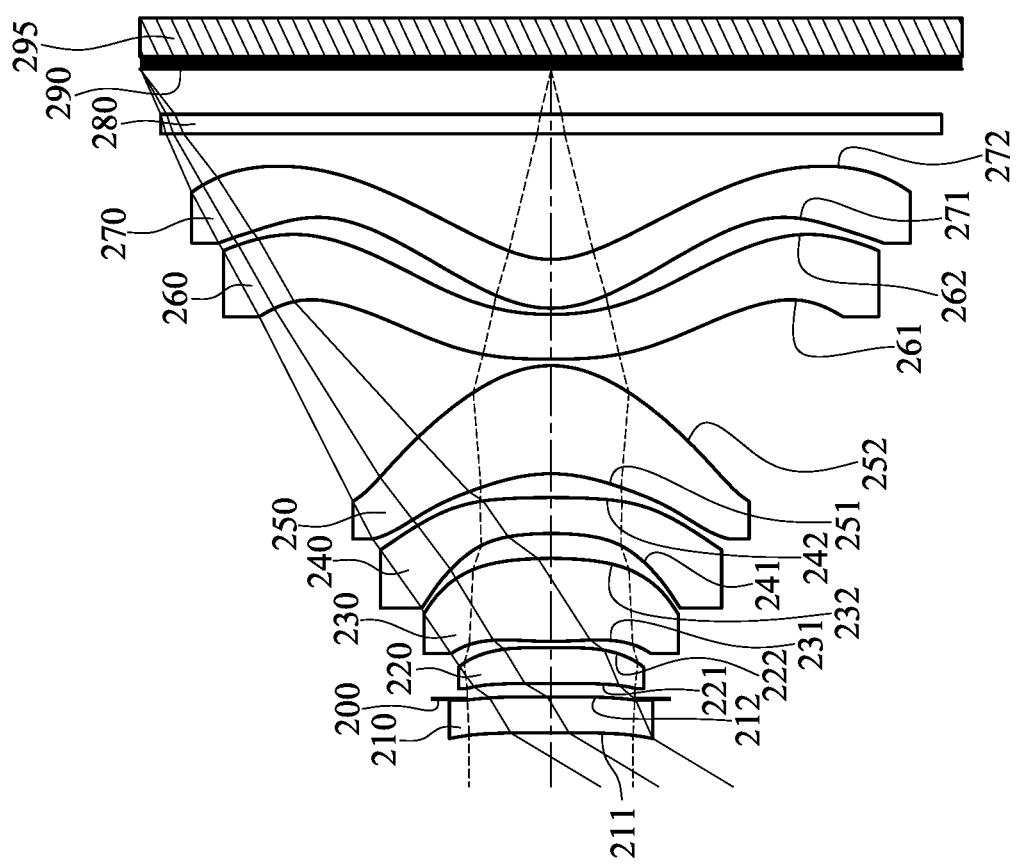
FIG. 3 is a schematic view of an image capturing unit according to the 2nd embodiment of the present disclosure.
Figure 4:
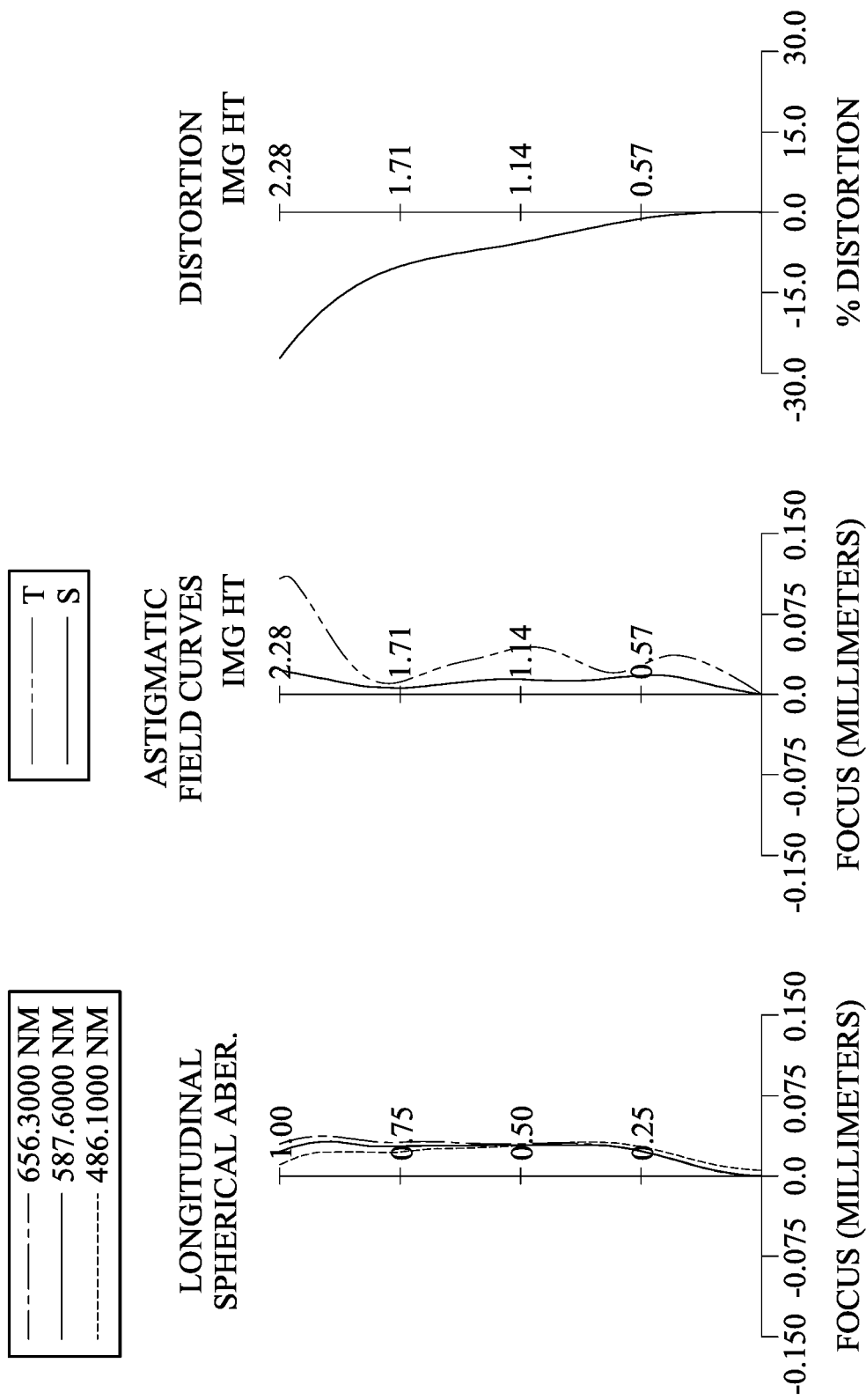
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical imaging lens assembly (its reference numeral is omitted) of the present disclosure and an image sensor 295. The optical imaging lens assembly includes, in order from an object side to an image side, a first lens element 210, an aperture stop 200, a second lens element 220, a third lens element 230, a fourth lens element 240, a fifth lens element 250, a sixth lens element 260, a seventh lens element 270, an IR-cut filter 280 and an image surface 290. The optical imaging lens assembly includes seven lens elements (210, 220, 230, 240, 250, 260 and 270) with no additional lens element disposed between each of the adjacent seven lens elements.

The first lens element 210 with negative refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of glass material and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric.

The fourth lens element 240 with negative refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with positive refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric.

The sixth lens element 260 with negative refractive power has an object-side surface 261 being convex in a paraxial region thereof and an image-side surface 262 being concave in a paraxial region thereof. The sixth lens element 260 is made of plastic material and has the object-side surface 261 and the image-side surface 262 being both aspheric.

The seventh lens element 270 with positive refractive power has an object-side surface 271 being convex in a paraxial region thereof and an image-side surface 272 being concave in a paraxial region thereof. The seventh lens element 270 is made of plastic material and has the object-side surface 271 and the image-side surface 272 being both aspheric. Each of the object-side surface 271 and the image-side surface 272 of the seventh lens element 270 has at least one critical point in an off-axis region thereof.

The IR-cut filter 280 is made of glass material and located between the seventh lens element 270 and the image surface 290, and will not affect the focal length of the optical imaging lens assembly. The image sensor 295 is disposed on or near the image surface 290 of the optical imaging lens assembly.

The detailed optical data of the 2nd embodiment are shown in Table 3 and the aspheric surface data are shown in Table 4 below.

TABLE 3

2nd Embodiment
f = 1.92 mm, Fno = 2.10, HFOV = 59.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 70.761 | (ASP) | 0.200 | Plastic | 1.669 | 19.5 | −65.32 |
| 2 | | 26.982 | (ASP) | −0.012 | | | | |
| 3 | Ape. Stop | Plano | | 0.087 | | | | |
| 4 | Lens 2 | 28.658 | (ASP) | 0.200 | Glass | 1.658 | 36.9 | −5422.10 |
| 5 | | 28.351 | (ASP) | 0.035 | | | | |
| 6 | Lens 3 | 1.827 | (ASP) | 0.463 | Plastic | 1.544 | 56.0 | 1.94 |
| 7 | | −2.280 | (ASP) | 0.139 | | | | |
| 8 | Lens 4 | −1.858 | (ASP) | 0.200 | Plastic | 1.669 | 19.5 | −4.36 |
| 9 | | −5.335 | (ASP) | 0.133 | | | | |
| 10 | Lens 5 | −0.866 | (ASP) | 0.603 | Plastic | 1.544 | 56.0 | 1.82 |
| 11 | | −0.575 | (ASP) | 0.035 | | | | |
| 12 | Lens 6 | 3.862 | (ASP) | 0.250 | Plastic | 1.669 | 19.5 | −3.73 |
| 13 | | 1.477 | (ASP) | 0.035 | | | | |
| 14 | Lens 7 | 0.612 | (ASP) | 0.272 | Plastic | 1.544 | 56.0 | 197.71 |
| 15 | | 0.520 | (ASP) | 0.700 | | | | |

TABLE 3-continued

2nd Embodiment
f = 1.92 mm, Fno = 2.10, HFOV = 59.0 deg.

| Surface # | | Curvature Radius | Thickness | Material | Index | Abbe # | Focal Length |
|---|---|---|---|---|---|---|---|
| 16 | IR-cut filter | Plano | 0.110 | Glass | 1.517 | 64.2 | — |
| 17 | | Plano | 0.251 | | | | |
| 18 | Image | Plano | — | | | | |

Note:
Reference wavelength is 587.6 nm (d-line).
An effective radius of the image-side surface 242 (Surface 9) is 0.950 mm.

TABLE 4

Aspheric Coefficients

| Surface # | 1 | 2 | 4 | 5 | 6 |
|---|---|---|---|---|---|
| k= | −9.0000E+01 | −9.0000E+01 | 2.0000E+01 | −9.0000E+01 | −4.3482E+01 |
| A4= | −3.5230E−01 | −6.1386E−01 | −8.4480E−01 | −2.8110E+00 | −2.0718E+00 |
| A6= | 5.6286E−01 | 2.4008E+00 | 6.4609E+00 | 1.4783E+01 | 1.1905E+01 |
| A8= | −6.8195E+00 | −2.8531E+01 | −8.2055E+01 | −9.7274E+01 | −1.0345E+02 |
| A10= | 4.4013E+01 | 2.3442E+02 | 6.0294E+02 | 4.4580E+02 | 5.8730E+02 |
| A12= | −1.8714E+02 | −1.1671E+03 | −2.6074E+03 | −1.2546E+03 | −1.9556E+03 |
| A14= | 4.5159E+02 | 3.1978E+03 | 5.8210E+03 | 1.7605E+03 | 3.3957E+03 |
| A16= | −4.2019E+02 | −3.2791E+03 | −4.8953E+03 | −8.1179E+02 | −2.3564E+03 |

| Surface # | 7 | 8 | 9 | 10 | 11 |
|---|---|---|---|---|---|
| k= | 5.1188E+00 | 3.2777E+00 | 1.2602E+01 | −8.7761E+00 | −1.8658E+00 |
| A4= | −1.9151E−01 | −7.8536E−01 | 4.6141E−02 | −9.0453E−01 | −3.5348E−02 |
| A6= | −2.6260E+00 | −2.2697E−01 | −3.0605E+00 | 5.3567E+00 | −6.2094E−01 |
| A8= | 5.6174E+00 | −3.6370E+01 | 8.8577E+00 | −1.6862E+01 | 2.3197E+00 |
| A10= | −7.7079E+00 | 2.4295E+02 | −1.2646E+01 | 2.7176E+01 | −3.9461E+00 |
| A12= | 3.6686E+01 | −6.2689E+02 | 1.0176E+01 | −2.3329E+01 | 3.3256E+00 |
| A14= | −1.1610E+02 | 7.3061E+02 | −4.3398E+00 | 1.0343E+01 | −1.3039E+00 |
| A16= | 1.0862E+02 | −3.1691E+02 | 7.4926E−01 | −1.8809E+00 | 1.8851E−01 |

| Surface # | 12 | 13 | 14 | 15 |
|---|---|---|---|---|
| k= | −9.0000E+01 | −7.5863E−01 | −1.3179E+00 | −3.2132E+00 |
| A4= | 7.0311E−01 | 3.0521E−01 | −5.2291E−01 | −9.6757E−02 |
| A6= | −1.0183E+00 | −6.6195E−01 | 5.1856E−01 | 6.3562E−02 |
| A8= | 7.5656E−01 | 5.4018E−01 | −3.6837E−01 | −5.1666E−02 |
| A10= | −3.3169E−01 | −2.5539E−01 | 1.4934E−01 | 2.4391E−02 |
| A12= | 8.2069E−02 | 7.0212E−02 | −3.3074E−02 | −6.1336E−03 |
| A14= | −1.0375E−02 | −1.0330E−02 | 3.7389E−03 | 7.6304E−04 |
| A16= | 5.1470E−04 | 6.2686E−04 | −1.6845E−04 | −3.6649E−05 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 1.92 | |R14/R3| | 0.02 |
| Fno | 2.10 | |R14/R4| | 0.02 |
| HFOV [deg.] | 59.0 | |R14/R5| | 0.28 |
| FOV [deg.] | 118.0 | |R14/R6| | 0.23 |
| V20 | 3 | |R14/R7| | 0.28 |
| TL/ImgH | 1.62 | |R14/R8| | 0.10 |
| Td/|Y72| | 1.32 | |R14/R9| | 0.60 |
| |Y11/Y72| | 0.28 | |R14/R10| | 0.90 |
| |Y11/Ystop| | 1.21 | |R14/R11| | 0.13 |
| |Y72|/f | 1.04 | |R14/R12| | 0.35 |
| |Yc62/Yc72| | 0.95 | |R14/R13| | 0.85 |
| |Yc_55|/ImgH | 0.80 | R14/|Y72| | 0.26 |
| |R14/R1| | 0.01 | f/R12 | 1.30 |
| |R14/R2| | 0.02 | |f/f1| + |f/f2| | 0.03 |

3rd Embodiment

Figure 5:
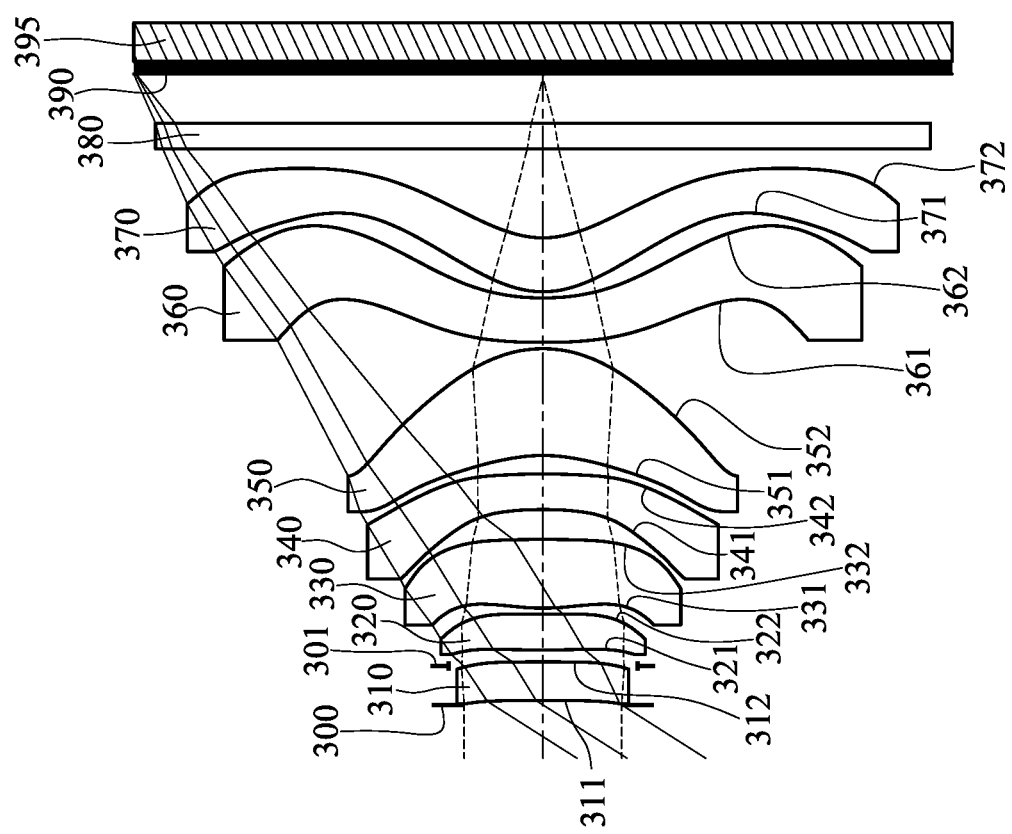
FIG. 5 is a schematic view of an image capturing unit according to the 3rd embodiment of the present disclosure.
Figure 6:
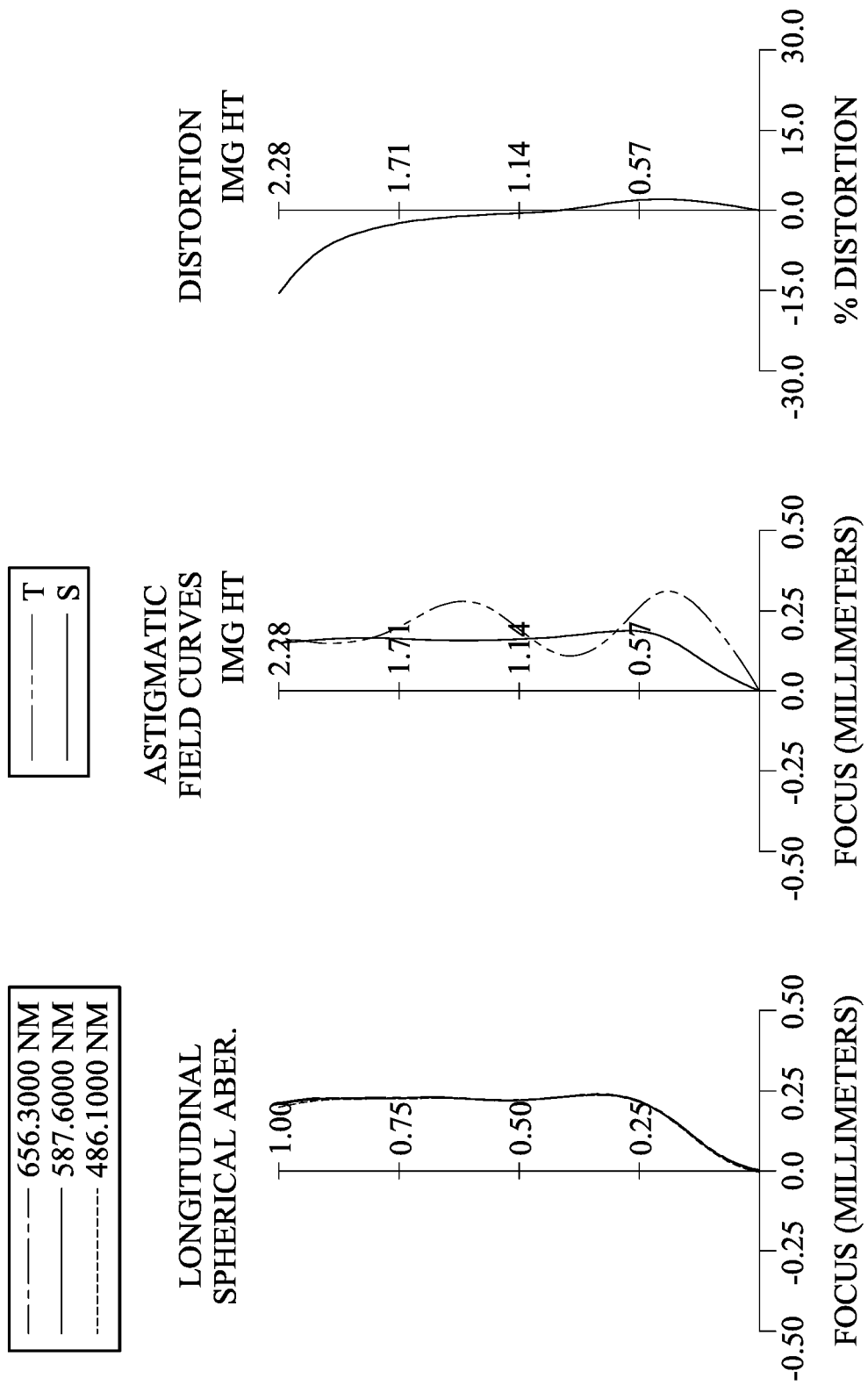
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical imaging lens assembly (its reference numeral is omitted) of the present disclosure and an image sensor 395. The optical imaging lens assembly includes, in order from an object side to an image side, an aperture stop 300, a first lens element 310, a stop 301, a second lens element 320, a third lens element 330, a fourth lens element 340, a fifth lens element 350, a sixth lens element 360, a seventh lens element 370, an IR-cut filter 380 and an image surface 390. The optical imaging lens assembly includes seven lens elements (310, 320, 330, 340, 350, 360 and 370) with no additional lens element disposed between each of the adjacent seven lens elements.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric.

The fourth lens element 340 with negative refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with positive refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric.

The sixth lens element 360 with negative refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric.

The seventh lens element 370 with positive refractive power has an object-side surface 371 being convex in a paraxial region thereof and an image-side surface 372 being concave in a paraxial region thereof. The seventh lens element 370 is made of plastic material and has the object-side surface 371 and the image-side surface 372 being both aspheric. Each of the object-side surface 371 and the image-side surface 372 of the seventh lens element 370 has at least one critical point in an off-axis region thereof.

The IR-cut filter 380 is made of glass material and located between the seventh lens element 370 and the image surface 390, and will not affect the focal length of the optical imaging lens assembly. The image sensor 395 is disposed on or near the image surface 390 of the optical imaging lens assembly.

The detailed optical data of the 3rd embodiment are shown in Table 5 and the aspheric surface data are shown in Table 6 below.

TABLE 5

3rd Embodiment
f = 1.65 mm, Fno = 1.87, HFOV = 57.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.024 | | | | |
| 2 | Lens 1 | 70.761 | (ASP) | 0.217 | Plastic | 1.614 | 26.0 | 489.20 |
| 3 | | 92.471 | (ASP) | −0.023 | | | | |
| 4 | Stop | Plano | | 0.090 | | | | |
| 5 | Lens 2 | 5.238 | (ASP) | 0.200 | Plastic | 1.544 | 56.0 | −15.98 |
| 6 | | 3.225 | (ASP) | 0.035 | | | | |
| 7 | Lens 3 | 1.024 | (ASP) | 0.386 | Plastic | 1.544 | 56.0 | 1.73 |
| 8 | | −10.284 | (ASP) | 0.168 | | | | |
| 9 | Lens 4 | −2.232 | (ASP) | 0.200 | Plastic | 1.669 | 19.5 | −9.66 |
| 10 | | −3.534 | (ASP) | 0.104 | | | | |
| 11 | Lens 5 | −0.895 | (ASP) | 0.600 | Plastic | 1.544 | 56.0 | 2.65 |
| 12 | | −0.682 | (ASP) | 0.035 | | | | |
| 13 | Lens 6 | 3.712 | (ASP) | 0.250 | Plastic | 1.669 | 19.5 | −3.46 |
| 14 | | 1.387 | (ASP) | 0.035 | | | | |
| 15 | Lens 7 | 0.525 | (ASP) | 0.303 | Plastic | 1.544 | 56.0 | 4.42 |
| 16 | | 0.535 | (ASP) | 0.500 | | | | |
| 17 | IR-cut filter | Plano | | 0.145 | Glass | 1.517 | 64.2 | — |
| 18 | | Plano | | 0.275 | | | | |
| 19 | Image | Plano | | — | | | | |

Note:
Reference wavelength is 587.6 nm (d-line).
An effective radius of the stop 301 (Surface 4) is 0.530 mm.
An effective radius of the object-side surface 341 (Surface 9) is 0.800 mm.

TABLE 6

Aspheric Coefficients

| Surface # | 2 | 3 | 5 | 6 | 7 |
|---|---|---|---|---|---|
| k= | −9.0000E+01 | −5.4003E+01 | 2.0000E+01 | −9.0000E+01 | −9.0000E+01 |
| A4= | −1.0750E+00 | −5.3613E−01 | −6.1982E−01 | −3.1246E+00 | 1.3686E+00 |
| A6= | 2.1240E+01 | −6.3195E+00 | 1.9019E+00 | 2.0361E+01 | −3.0225E+01 |
| A8= | −3.6696E+02 | 9.0921E+01 | −1.9424E+01 | −1.2947E+02 | 2.3477E+02 |
| A10= | 3.4907E+03 | −7.8741E+02 | 4.0218E+01 | 4.6226E+02 | −1.1478E+03 |
| A12= | −1.8783E+04 | 3.7954E+03 | — | −9.0606E+02 | 3.2538E+03 |
| A14= | 5.3296E+04 | −9.3419E+03 | — | 7.7786E+02 | −4.8778E+03 |
| A16= | −6.1952E+04 | 9.2963E+03 | — | — | 2.9909E+03 |

| Surface # | 8 | 10 | 11 | 12 | 13 |
|---|---|---|---|---|---|
| k= | 1.4850E+01 | −6.2831E+01 | −9.2458E+00 | −1.5734E+00 | −2.0950E+01 |
| A4= | −3.3884E−01 | 5.6917E−01 | 1.0768E+00 | −2.6736E−01 | 5.1373E−01 |
| A6= | −2.4112E−01 | −7.4384E+00 | −2.1265E+00 | 5.0588E−02 | −5.2234E−01 |
| A8= | −4.8729E+00 | 2.3123E+01 | 1.0320E+01 | 1.3297E+00 | −5.1293E−02 |
| A10= | 1.4011E+01 | −3.5408E+01 | −2.5089E+01 | −1.9873E+00 | 3.9176E−01 |
| A12= | 1.0053E+01 | 2.8716E+01 | 3.0830E+01 | 1.7951E+00 | −2.8728E−01 |
| A14= | −7.6826E+01 | −1.1337E+01 | −1.8294E+01 | 1.0567E+00 | 8.7601E−02 |
| A16= | 6.8479E+01 | 1.5614E+00 | 4.1939E+00 | −4.3476E−01 | −9.7791E−03 |

| Surface # | 14 | 15 | 16 |
|---|---|---|---|
| k= | −1.0082E+00 | −1.6348E+00 | −2.5882E+00 |
| A4= | 4.2613E−01 | −4.8822E−01 | −2.4717E−01 |
| A6= | −9.5890E−01 | 5.3747E−01 | 8.9114E−02 |
| A8= | 8.4242E−01 | −5.1638E−01 | 1.5610E−03 |
| A10= | −4.3281E−01 | 2.9531E−01 | −1.4569E−02 |
| A12= | 1.3096E−01 | −9.2231E−02 | 6.5253E−03 |
| A14= | −2.1480E−02 | 1.4656E−02 | −1.3583E−03 |
| A16= | 1.4706E−03 | −9.2714E−04 | 1.0983E−04 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 1.65 | |R14/R3| | 0.10 |
| Fno | 1.87 | |R14/R4| | 0.17 |
| HFOV [deg.] | 57.5 | |R14/R5| | 0.52 |
| FOV [deg.] | 115.0 | |R14/R6| | 0.05 |
| V20 | 2 | |R14/R7| | 0.24 |
| TL/ImgH | 1.54 | |R14/R8| | 0.15 |
| Td/|Y72| | 1.30 | |R14/R9| | 0.60 |
| |Y11/Y72| | 0.22 | |R14/R10| | 0.78 |
| |Y11/Ystop| | 1.00 | |R14/R11| | 0.14 |
| |Y72|/f | 1.21 | |R14/R12| | 0.39 |
| |Yc62/Yc72| | 0.95 | |R14/R13| | 1.02 |
| |Yc_55|/ImgH | 0.81 | R14/|Y72| | 0.27 |
| |R14/R1| | 0.01 | f/R12 | 1.19 |
| |R14/R2| | 0.01 | |f/f1| + |f/f2| | 0.11 |

4th Embodiment

Figure 7:
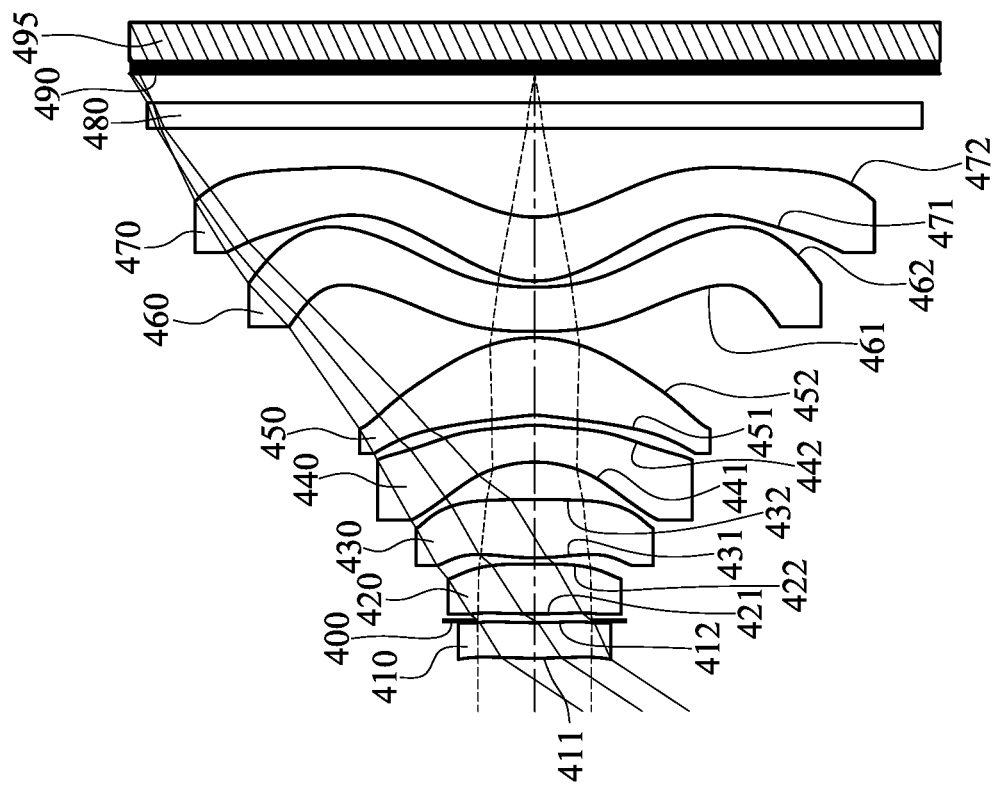
FIG. 7 is a schematic view of an image capturing unit according to the 4th embodiment of the present disclosure.
Figure 8:
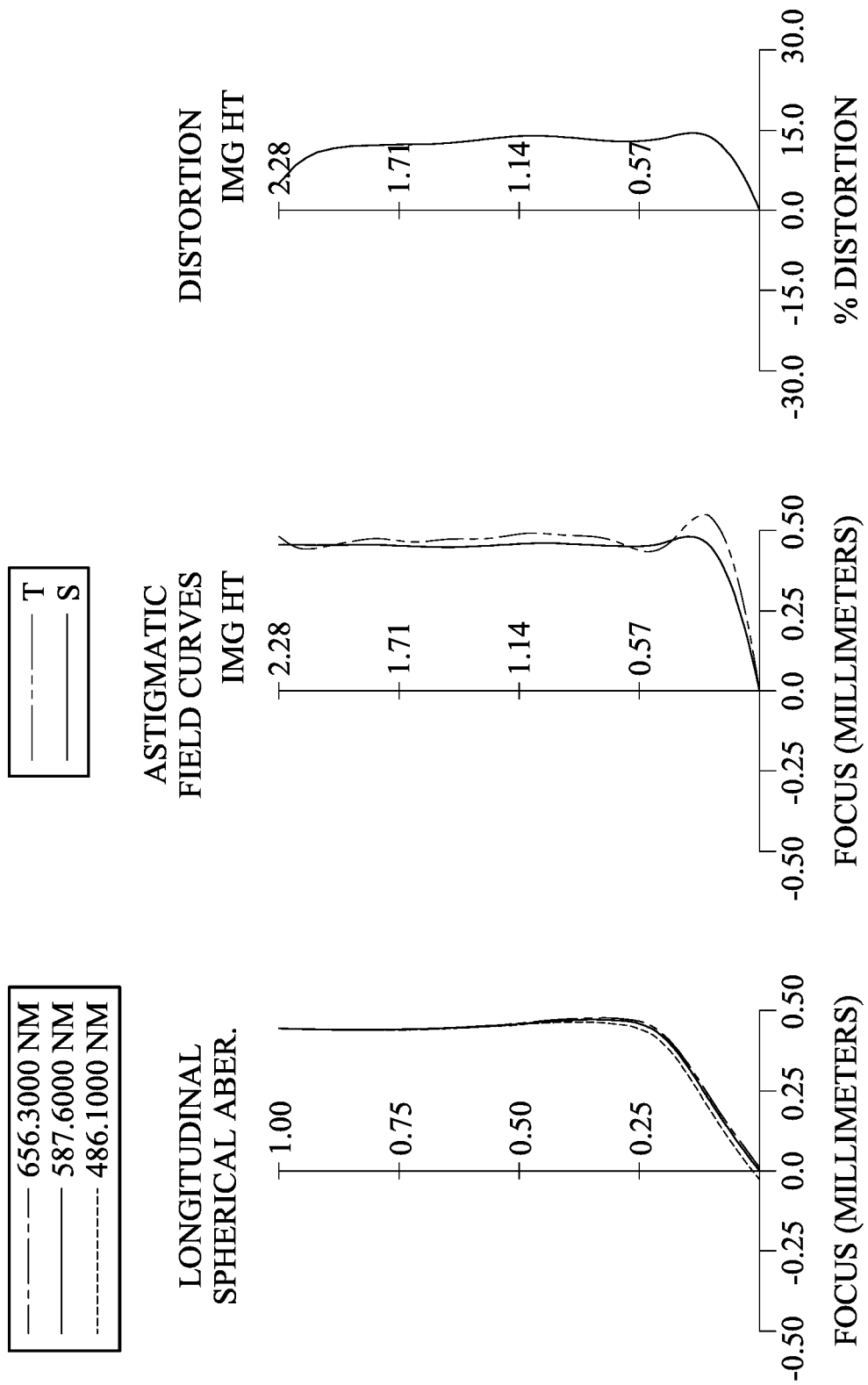
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical imaging lens assembly (its reference numeral is omitted) of the present disclosure and an image sensor 495. The optical imaging lens assembly includes, in order from an object side to an image side, a first lens element 410, an aperture stop 400, a second lens element 420, a third lens element 430, a fourth lens element 440, a fifth lens element 450, a sixth lens element 460, a seventh lens element 470, an IR-cut filter 480 and an image surface 490. The optical imaging lens assembly includes seven lens elements (410, 420, 430, 440, 450, 460 and 470) with no additional lens element disposed between each of the adjacent seven lens elements.

The first lens element 410 with negative refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with positive refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric.

The fourth lens element 440 with positive refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric.

The sixth lens element 460 with negative refractive power has an object-side surface 461 being convex in a paraxial region thereof and an image-side surface 462 being concave in a paraxial region thereof. The sixth lens element 460 is made of plastic material and has the object-side surface 461 and the image-side surface 462 being both aspheric.

The seventh lens element 470 with positive refractive power has an object-side surface 471 being convex in a paraxial region thereof and an image-side surface 472 being concave in a paraxial region thereof. The seventh lens element 470 is made of plastic material and has the object-side surface 471 and the image-side surface 472 being both aspheric. Each of the object-side surface 471 and the image-side surface 472 of the seventh lens element 470 has at least one critical point in an off-axis region thereof.

The IR-cut filter 480 is made of glass material and located between the seventh lens element 470 and the image surface 490, and will not affect the focal length of the optical imaging lens assembly. The image sensor 495 is disposed on or near the image surface 490 of the optical imaging lens assembly.

The detailed optical data of the 4th embodiment are shown in Table 7 and the aspheric surface data are shown in Table 8 below.

TABLE 7

4th Embodiment
f = 1.25 mm, Fno = 1.95, HFOV = 56.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.814 | (ASP) | 0.200 | Plastic | 1.545 | 56.1 | −24.92 |
| 2 | | 2.923 | (ASP) | 0.011 | | | | |
| 3 | Ape. Stop | Plano | | 0.039 | | | | |
| 4 | Lens 2 | 4.175 | (ASP) | 0.281 | Plastic | 1.544 | 56.0 | 9.06 |
| 5 | | 26.618 | (ASP) | 0.035 | | | | |
| 6 | Lens 3 | 1.133 | (ASP) | 0.329 | Plastic | 1.544 | 56.0 | 1.92 |
| 7 | | −12.278 | (ASP) | 0.212 | | | | |
| 8 | Lens 4 | −0.651 | (ASP) | 0.209 | Plastic | 1.639 | 23.5 | 0.71 |
| 9 | | −0.300 | (ASP) | 0.056 | | | | |
| 10 | Lens 5 | −0.287 | (ASP) | 0.437 | Plastic | 1.544 | 56.0 | −1.23 |
| 11 | | −0.770 | (ASP) | 0.035 | | | | |
| 12 | Lens 6 | 3.138 | (ASP) | 0.250 | Plastic | 1.669 | 19.5 | −5.06 |
| 13 | | 1.576 | (ASP) | 0.035 | | | | |
| 14 | Lens 7 | 0.539 | (ASP) | 0.361 | Plastic | 1.544 | 56.0 | 3.06 |
| 15 | | 0.608 | (ASP) | 0.500 | | | | |
| 16 | IR-cut filter | Plano | | 0.145 | Glass | 1.517 | 64.2 | — |
| 17 | | Plano | | 0.165 | | | | |
| 18 | Image | Plano | | — | | | | |

Note:
Reference wavelength is 587.6 nm (d-line).
An effective radius of the object-side surface 441 (Surface 8) is 0.700 mm.

TABLE 8

Aspheric Coefficients

| Surface # | 1 | 2 | 4 | 5 | 6 |
|---|---|---|---|---|---|
| k= | −6.7482E+01 | −5.6531E+01 | −1.7169E+01 | −9.0000E+01 | −3.3888E+00 |
| A4= | −4.8939E−01 | −8.8318E−01 | −2.1173E−01 | −3.7131E+00 | −1.0706E+00 |
| A6= | −1.7668E+00 | −4.9578E+00 | −7.0153E+00 | 2.6694E+01 | −5.8786E−02 |
| A8= | — | −1.6155E+01 | −1.9994E+00 | −1.8273E+02 | −1.7590E+00 |
| A10= | — | 1.3348E+02 | 9.8377E+01 | 6.3436E+02 | −5.1161E+01 |
| A12= | — | — | — | −7.5437E+02 | 1.7494E+02 |

| Surface # | 7 | 8 | 9 | 10 | 11 |
|---|---|---|---|---|---|
| k= | −3.6967E+01 | −4.7637E+00 | −9.0000E+01 | −6.2076E+01 | −2.5795E+00 |
| A4= | 8.1842E−02 | 8.0705E−01 | 1.1391E+00 | 4.2377E−01 | −2.0064E−01 |
| A6= | −7.8664E+00 | −3.3439E+01 | −1.5754E+01 | −5.7315E+00 | −1.4498E+00 |
| A8= | 5.2021E+01 | 2.0424E+02 | 6.4925E+01 | 2.5557E+01 | 7.6927E+00 |
| A10= | −2.5663E+02 | −5.5410E+02 | −1.3629E+02 | −5.8734E+01 | −1.3018E+01 |
| A12= | 8.2486E+02 | 7.2528E+02 | 1.5917E+02 | 7.1559E+01 | 7.8776E+00 |
| A14= | −1.4997E+03 | −3.7189E+02 | −9.7948E+01 | −4.3788E+01 | 2.2015E−01 |
| A16= | 1.1366E+03 | — | 2.4467E+01 | 1.0526E+01 | −1.1959E+00 |

TABLE 8-continued

| Aspheric Coefficients | | | | |
|---|---|---|---|---|
| Surface # | 12 | 13 | 14 | 15 |
| k= | −2.0582E+01 | −1.1181E+00 | −1.9354E+00 | −3.6270E+00 |
| A4= | 1.0790E+00 | 9.1650E−01 | −3.6775E−01 | 1.5109E−02 |
| A6= | −2.3007E+00 | −2.4980E+00 | 3.8485E−01 | −5.1589E−01 |
| A8= | 2.2693E+00 | 2.9722E+00 | −5.1545E−01 | 5.8377E−01 |
| A10= | −1.1022E+00 | −2.0190E+00 | 3.8056E−01 | −3.0436E−01 |
| A12= | 1.6422E−01 | 7.8465E−01 | −1.4217E−01 | 8.5822E−02 |
| A14= | 3.9771E−02 | −1.6237E−01 | 2.6018E−02 | −1.2758E−02 |
| A16= | −1.0779E−02 | 1.3894E−02 | −1.8609E−03 | 7.8566E−04 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 1.25 | |R14/R3| | 0.15 |
| Fno | 1.95 | |R14/R4| | 0.02 |
| HFOV [deg.] | 56.5 | |R14/R5| | 0.54 |
| FOV [deg.] | 113.0 | |R14/R6| | 0.05 |
| V20 | 1 | |R14/R7| | 0.93 |
| TL/ImgH | 1.44 | |R14/R8| | 2.03 |
| Td/|Y72| | 1.30 | |R14/R9| | 2.12 |
| |Y11/Y72| | 0.22 | |R14/R10| | 0.79 |
| |Y11/Ystop| | 1.34 | |R14/R11| | 0.19 |
| |Y72|/f | 1.54 | |R14/R12| | 0.39 |
| |Yc62/Yc72| | 1.09 | |R14/R13| | 1.13 |
| |Yc_55|/ImgH | 0.81 | R14/|Y72| | 0.32 |
| |R14/R1| | 0.16 | f/R12 | 0.79 |
| |R14/R2| | 0.21 | |f/f1| + |f/f2| | 0.19 |

5th Embodiment

Figure 9:
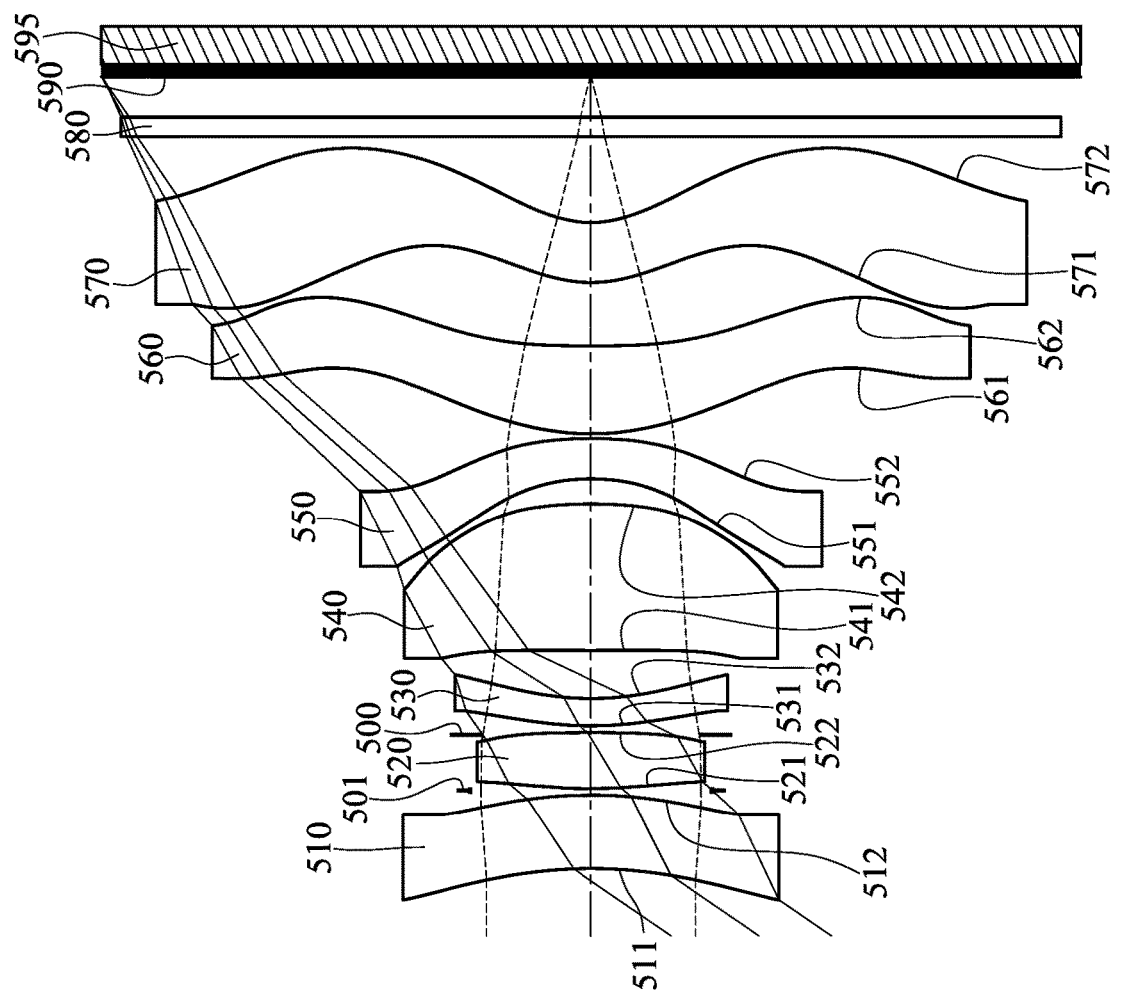
FIG. 9 is a schematic view of an image capturing unit according to the 5th embodiment of the present disclosure.
Figure 10:
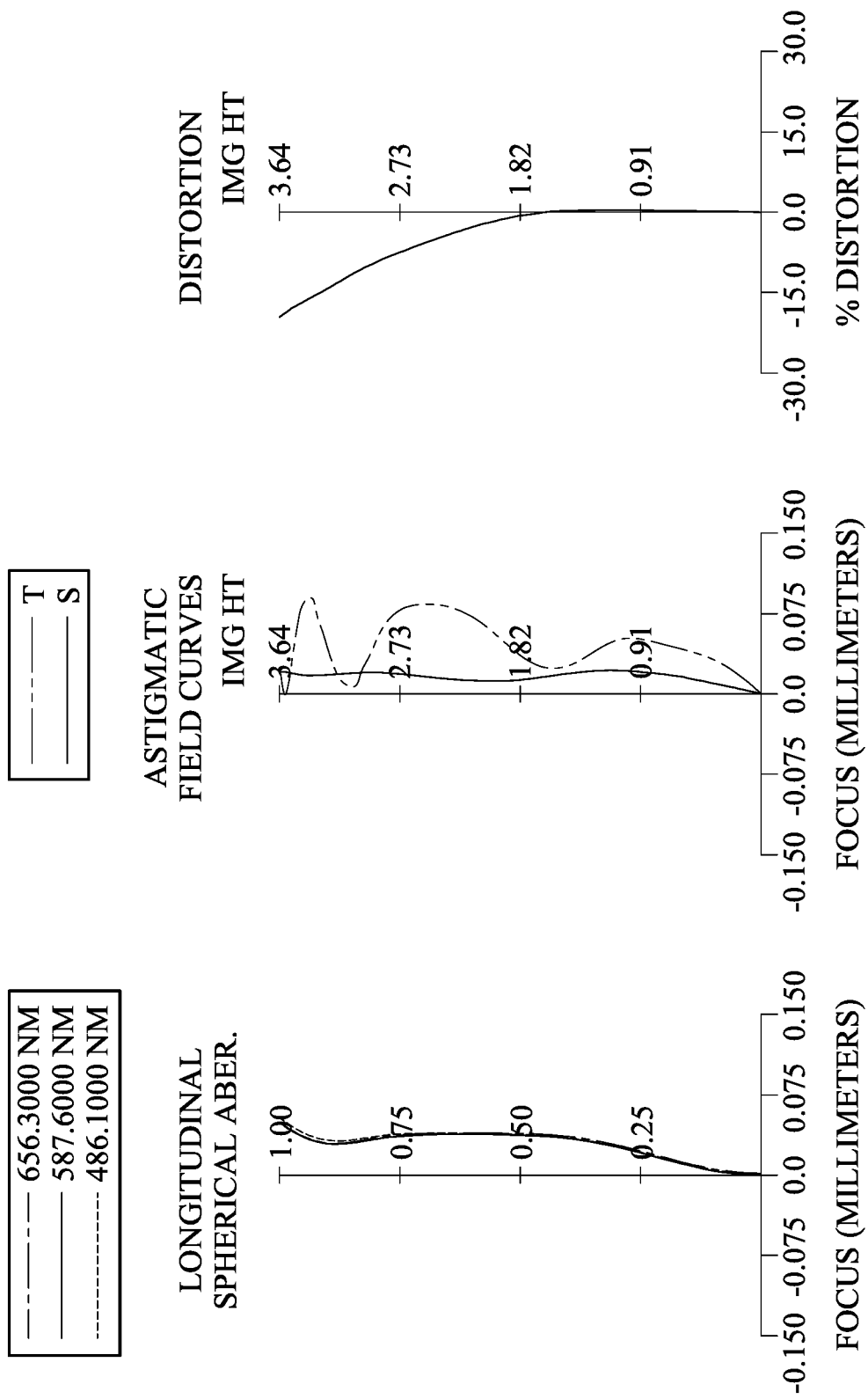
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical imaging lens assembly (its reference numeral is omitted) of the present disclosure and an image sensor 595. The optical imaging lens assembly includes, in order from an object side to an image side, a first lens element 510, a stop 501, a second lens element 520, an aperture stop 500, a third lens element 530, a fourth lens element 540, a fifth lens element 550, a sixth lens element 560, a seventh lens element 570, an IR-cut filter 580 and an image surface 590. The optical imaging lens assembly includes seven lens elements (510, 520, 530, 540, 550, 560 and 570) with no additional lens element disposed between each of the adjacent seven lens elements.

The first lens element 510 with positive refractive power has an object-side surface 511 being concave in a paraxial region thereof and an image-side surface 512 being convex in a paraxial region thereof. The first lens element 510 is made of plastic material and has the object-side surface 511 and the image-side surface 512 being both aspheric.

The second lens element 520 with positive refractive power has an object-side surface 521 being convex in a paraxial region thereof and an image-side surface 522 being convex in a paraxial region thereof. The second lens element 520 is made of plastic material and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric.

The sixth lens element 560 with positive refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric.

The seventh lens element 570 with negative refractive power has an object-side surface 571 being convex in a paraxial region thereof and an image-side surface 572 being concave in a paraxial region thereof. The seventh lens element 570 is made of plastic material and has the object-side surface 571 and the image-side surface 572 being both aspheric. Each of the object-side surface 571 and the image-side surface 572 of the seventh lens element 570 has at least one critical point in an off-axis region thereof.

The IR-cut filter 580 is made of glass material and located between the seventh lens element 570 and the image surface 590, and will not affect the focal length of the optical imaging lens assembly. The image sensor 595 is disposed on or near the image surface 590 of the optical imaging lens assembly.

The detailed optical data of the 5th embodiment are shown in Table 9 and the aspheric surface data are shown in Table 10 below.

TABLE 9

5th Embodiment
f = 3.13 mm, Fno = 2.01, HFOV = 55.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.416 | (ASP) | 0.550 | Plastic | 1.545 | 56.1 | 209.88 |
| 2 | | −3.505 | (ASP) | 0.036 | | | | |
| 3 | Stop | Plano | | 0.014 | | | | |
| 4 | Lens 2 | 3.813 | (ASP) | 0.416 | Plastic | 1.544 | 56.0 | 5.51 |
| 5 | | −13.453 | (ASP) | −0.018 | | | | |
| 6 | Ape. Stop | Plano | | 0.069 | | | | |
| 7 | Lens 3 | 2.832 | (ASP) | 0.201 | Plastic | 1.582 | 30.2 | −19.47 |
| 8 | | 2.207 | (ASP) | 0.358 | | | | |
| 9 | Lens 4 | 60.177 | (ASP) | 1.092 | Plastic | 1.544 | 56.0 | 6.40 |
| 10 | | −3.674 | (ASP) | 0.188 | | | | |
| 11 | Lens 5 | −1.541 | (ASP) | 0.300 | Plastic | 1.669 | 19.5 | −4.41 |
| 12 | | −3.482 | (ASP) | 0.035 | | | | |
| 13 | Lens 6 | 1.935 | (ASP) | 0.651 | Plastic | 1.544 | 56.0 | 4.10 |
| 14 | | 12.835 | (ASP) | 0.471 | | | | |
| 15 | Lens 7 | 1.006 | (ASP) | 0.450 | Plastic | 1.544 | 56.0 | −25.56 |
| 16 | | 0.790 | (ASP) | 0.640 | | | | |
| 17 | IR-cut filter | Plano | | 0.145 | Glass | 1.517 | 64.2 | — |
| 18 | | Plano | | 0.300 | | | | |
| 19 | Image | Plano | | — | | | | |

Note:
Reference wavelength is 587.6 nm (d-line).
An effective radius of the stop 501 (Surface 3) is 0.900 mm.

TABLE 10

Aspheric Coefficients

| Surface # | 1 | 2 | 4 | 5 | 7 |
|---|---|---|---|---|---|
| k= | −3.9540E+00 | −1.6220E+00 | −3.7685E+00 | 9.0000E+01 | 5.8756E+00 |
| A4= | 4.8458E−04 | −4.9379E−02 | −1.1444E−01 | −1.3840E−02 | −5.8669E−03 |
| A6= | 2.0058E−03 | 1.6657E−01 | 1.7698E−01 | −5.0340E−01 | −5.0287E−01 |
| A8= | −2.4252E−03 | −2.6618E−01 | −3.9020E−01 | 1.4461E+00 | 1.1406E+00 |
| A10= | 3.0884E−03 | 2.7509E−01 | 4.7858E−01 | −2.2420E+00 | −1.4780E+00 |
| A12= | −1.0596E−03 | −1.5398E−01 | −3.0162E−01 | 1.8409E+00 | 1.0069E+00 |
| A14= | 1.3258E−04 | 3.7039E−02 | 7.6335E−02 | −6.2022E−01 | −2.9858E−01 |

| Surface # | 8 | 9 | 10 | 11 | 12 |
|---|---|---|---|---|---|
| k= | −4.3802E+00 | −9.0000E+01 | 4.8477E+00 | −4.7496E−02 | −3.9766E−02 |
| A4= | 4.3260E−02 | −2.4352E−02 | −7.6941E−02 | −1.4145E−01 | −2.4099E−01 |
| A6= | −1.9180E−01 | −4.2985E−02 | −3.3084E−01 | −8.2001E−02 | 2.4330E−01 |
| A8= | 2.7674E−01 | 1.0093E−01 | 6.5473E−01 | 5.0298E−01 | −1.1951E−01 |
| A10= | −2.1765E−01 | −1.3500E−01 | −5.4005E−01 | −4.3620E−01 | 3.9930E−02 |
| A12= | 6.8050E−02 | 5.7380E−02 | 2.4727E−01 | 1.5739E−01 | −7.9956E−03 |
| A14= | — | — | −7.0047E−02 | −2.0930E−02 | 6.7272E−04 |
| A16= | — | — | 1.0293E−02 | — | — |

| Surface # | 13 | 14 | 15 | 16 |
|---|---|---|---|---|
| k= | −7.2112E+00 | 1.4189E+01 | −2.9178E+00 | −2.1290E+00 |
| A4= | 6.8725E−02 | 1.4084E−01 | −9.1615E−02 | −1.3186E−01 |
| A6= | −5.1836E−02 | −9.9793E−02 | −4.0165E−02 | 4.4340E−02 |
| A8= | 2.2107E−02 | 4.4157E−02 | 3.5219E−02 | −9.0960E−03 |
| A10= | −7.8589E−03 | −1.4939E−02 | −1.0875E−02 | 9.0034E−04 |
| A12= | 2.0375E−03 | 3.6448E−03 | 1.8671E−03 | 9.2558E−06 |
| A14= | −3.5084E−04 | −5.9956E−04 | −1.9213E−04 | −1.1873E−05 |
| A16= | 3.8172E−05 | 6.1838E−05 | 1.1727E−05 | 1.2203E−06 |
| A18= | −2.3803E−06 | −3.5657E−06 | −3.8990E−07 | −5.4188E−08 |
| A20= | 6.4582E−08 | 8.7070E−08 | 5.4052E−09 | 9.2247E−10 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 3.13 | \|R14/R3\| | 0.21 |
| Fno | 2.01 | \|R14/R4\| | 0.06 |
| HFOV [deg.] | 55.6 | \|R14/R5\| | 0.28 |
| FOV [deg.] | 111.2 | \|R14/R6\| | 0.36 |
| V20 | 1 | \|R14/R7\| | 0.01 |
| TL/ImgH | 1.62 | \|R14/R8\| | 0.22 |
| Td/\|Y72\| | 1.49 | \|R14/R9\| | 0.51 |
| \|Y11/Y72\| | 0.43 | \|R14/R10\| | 0.23 |
| \|Y11/Ystop\| | 1.73 | \|R14/R11\| | 0.41 |
| \|Y72\|/f | 1.04 | \|R14/R12\| | 0.06 |
| \|Yc62/Yc72\| | 1.13 | \|R14/R13\| | 0.79 |
| \|Yc_55\|/ImgH | 0.86 | R14/\|Y72\| | 0.24 |
| \|R14/R1\| | 0.23 | f/R12 | 0.24 |
| \|R14/R2\| | 0.23 | \|f/f1\| + \|f/f2\| | 0.58 |

6th Embodiment

Figure 11:
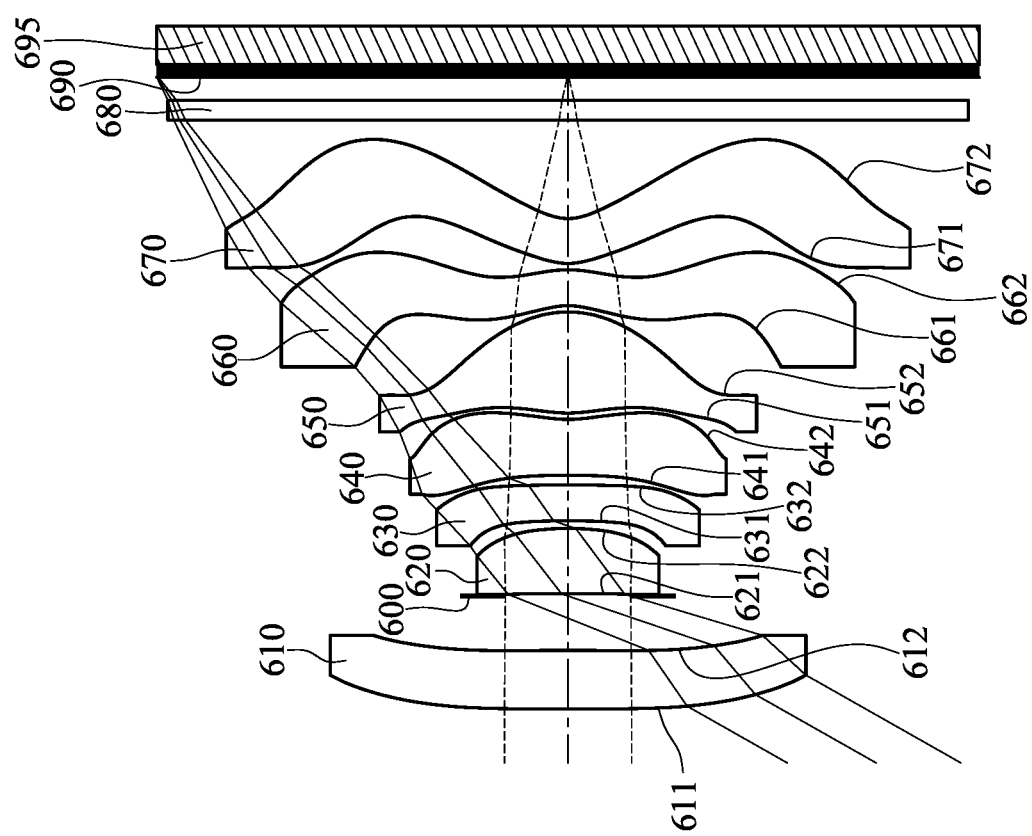
FIG. 11 is a schematic view of an image capturing unit according to the 6th embodiment of the present disclosure.
Figure 12:
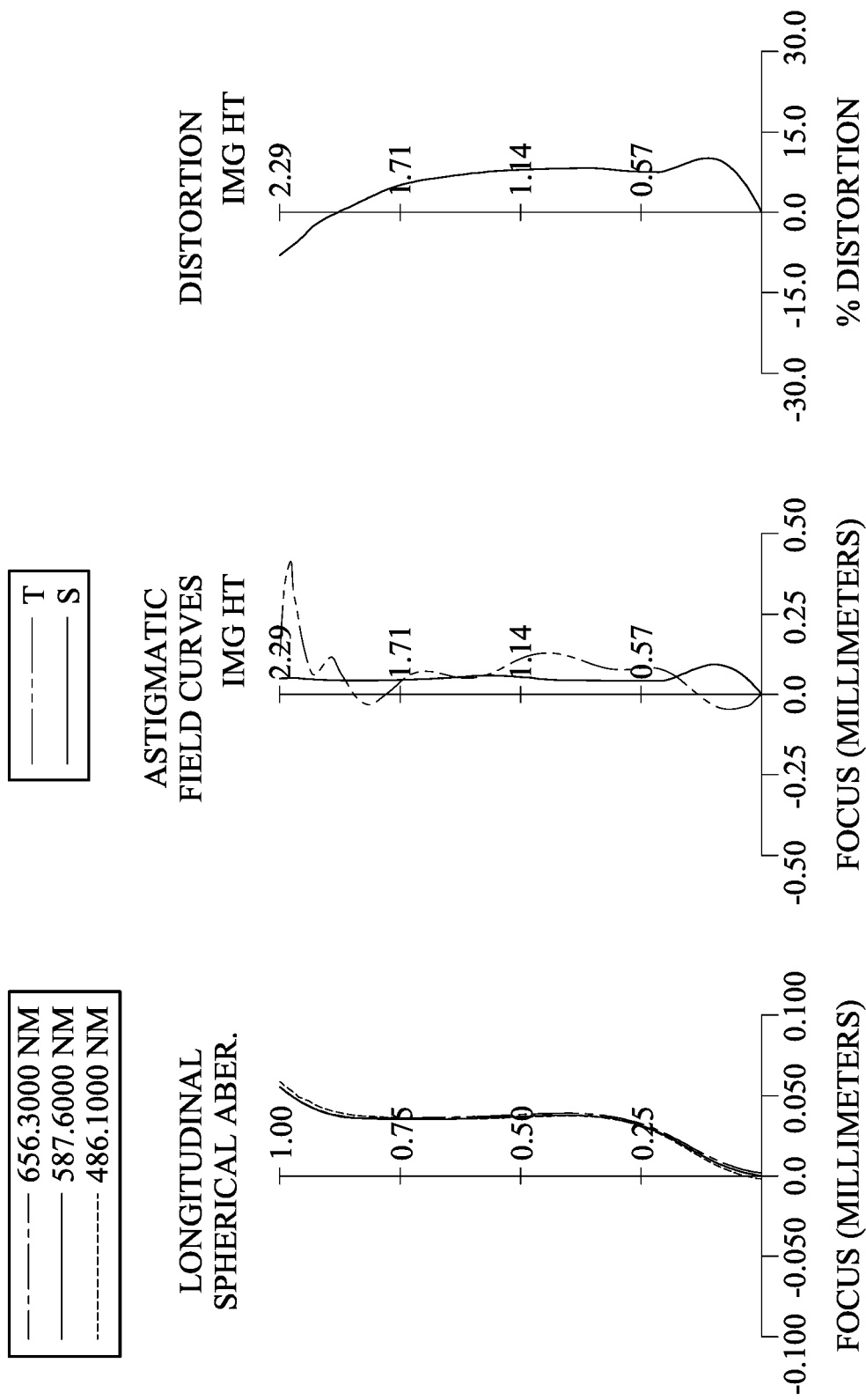
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical imaging lens assembly (its reference numeral is omitted) of the present disclosure and an image sensor 695. The optical imaging lens assembly includes, in order from an object side to an image side, a first lens element 610, an aperture stop 600, a second lens element 620, a third lens element 630, a fourth lens element 640, a fifth lens element 650, a sixth lens element 660, a seventh lens element 670, an IR-cut filter 680 and an image surface 690. The optical imaging lens assembly includes seven lens elements (610, 620, 630, 640, 650, 660 and 670) with no additional lens element disposed between each of the adjacent seven lens elements.

The first lens element 610 with positive refractive power has an object-side surface 611 being convex in a paraxial region thereof and an image-side surface 612 being convex in a paraxial region thereof. The first lens element 610 is made of plastic material and has the object-side surface 611 and the image-side surface 612 being both aspheric.

The second lens element 620 with positive refractive power has an object-side surface 621 being convex in a paraxial region thereof and an image-side surface 622 being convex in a paraxial region thereof. The second lens element 620 is made of plastic material and has the object-side surface 621 and the image-side surface 622 being both aspheric.

The third lens element 630 with negative refractive power has an object-side surface 631 being concave in a paraxial region thereof and an image-side surface 632 being convex in a paraxial region thereof. The third lens element 630 is made of plastic material and has the object-side surface 631 and the image-side surface 632 being both aspheric.

The fourth lens element 640 with negative refractive power has an object-side surface 641 being concave in a paraxial region thereof and an image-side surface 642 being concave in a paraxial region thereof. The fourth lens element 640 is made of plastic material and has the object-side surface 641 and the image-side surface 642 being both aspheric.

The fifth lens element 650 with positive refractive power has an object-side surface 651 being convex in a paraxial region thereof and an image-side surface 652 being convex in a paraxial region thereof. The fifth lens element 650 is made of plastic material and has the object-side surface 651 and the image-side surface 652 being both aspheric.

The sixth lens element 660 with negative refractive power has an object-side surface 661 being concave in a paraxial region thereof and an image-side surface 662 being convex in a paraxial region thereof. The sixth lens element 660 is made of plastic material and has the object-side surface 661 and the image-side surface 662 being both aspheric.

The seventh lens element 670 with positive refractive power has an object-side surface 671 being convex in a paraxial region thereof and an image-side surface 672 being concave in a paraxial region thereof. The seventh lens element 670 is made of plastic material and has the object-side surface 671 and the image-side surface 672 being both aspheric. Each of the object-side surface 671 and the image-side surface 672 of the seventh lens element 670 has at least one critical point in an off-axis region thereof.

The IR-cut filter 680 is made of glass material and located between the seventh lens element 670 and the image surface 690, and will not affect the focal length of the optical imaging lens assembly. The image sensor 695 is disposed on or near the image surface 690 of the optical imaging lens assembly.

The detailed optical data of the 6th embodiment are shown in Table 11 and the aspheric surface data are shown in Table 12 below.

TABLE 11

6th Embodiment
f = 1.40 mm, Fno = 1.98, HFOV = 60.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 94.518 | (ASP) | 0.327 | Plastic | 1.669 | 19.5 | 22.06 |
| 2 | | −17.459 | (ASP) | 0.303 | | | | |
| 3 | Ape. Stop | Plano | | 0.012 | | | | |
| 4 | Lens 2 | 70.883 | (ASP) | 0.365 | Plastic | 1.544 | 55.9 | 2.97 |
| 5 | | −1.652 | (ASP) | 0.042 | | | | |
| 6 | Lens 3 | −5.692 | (ASP) | 0.200 | Plastic | 1.669 | 19.5 | −16.22 |
| 7 | | −12.142 | (ASP) | 0.054 | | | | |
| 8 | Lens 4 | −7.380 | (ASP) | 0.312 | Plastic | 1.544 | 55.9 | −1.03 |
| 9 | | 0.617 | (ASP) | 0.035 | | | | |
| 10 | Lens 5 | 0.660 | (ASP) | 0.564 | Plastic | 1.544 | 55.9 | 0.69 |
| 11 | | −0.607 | (ASP) | 0.035 | | | | |
| 12 | Lens 6 | −0.386 | (ASP) | 0.200 | Plastic | 1.669 | 19.5 | −2.03 |
| 13 | | −0.650 | (ASP) | 0.035 | | | | |

TABLE 11-continued

6th Embodiment
f = 1.40 mm, Fno = 1.98, HFOV = 60.5 deg.

| Surface # | | Curvature Radius | | Thickness | Material | Index | Abbe # | Focal Length |
|---|---|---|---|---|---|---|---|---|
| 14 | Lens 7 | 0.315 | (ASP) | 0.250 | Plastic | 1.544 | 55.9 | 6.31 |
| 15 | | 0.250 | (ASP) | 0.550 | | | | |
| 16 | IR-cut filter | Plano | | 0.110 | Glass | 1.517 | 64.2 | — |
| 17 | | Plano | | 0.128 | | | | |
| 18 | Image | Plano | | — | | | | |

Note:
Reference wavelength is 587.6 nm (d-line).
An effective radius of the image-side surface 652 (Surface 11) is 1.050 mm.

TABLE 12

Aspheric Coefficients

| Surface # | 1 | 2 | 4 | 5 | 6 |
|---|---|---|---|---|---|
| k= | −9.0000E+01 | −3.1437E+00 | −1.0000E+00 | −1.0059E+00 | −1.0000E+00 |
| A4= | 7.4749E−02 | 1.4503E−01 | −5.2002E−02 | −5.8238E−01 | −2.6434E−01 |
| A6= | 6.0276E−05 | −6.9494E−02 | −4.5487E+00 | −3.9691E+00 | −2.3771E+00 |
| A8= | −1.6698E−02 | 6.5770E−04 | 3.9188E+01 | 1.3254E+01 | −1.1961E+01 |
| A10= | 6.4962E−03 | 1.2796E−02 | −1.5435E+02 | −2.5306E+01 | 6.0261E+01 |
| A12= | — | — | — | — | −1.0799E+02 |

| Surface # | 7 | 8 | 9 | 10 | 11 |
|---|---|---|---|---|---|
| k= | −1.0000E+00 | −1.0000E+01 | −4.0000E+01 | −3.4298E+01 | −2.2141E+00 |
| A4= | −7.5895E−02 | −9.3623E−01 | −5.5935E−01 | −9.8183E−01 | −9.2628E−01 |
| A6= | 5.5270E−01 | 2.4385E+00 | 3.8225E−02 | 6.8249E−01 | 3.5771E+00 |
| A8= | −8.3495E+00 | −4.9369E+00 | 3.8910E+01 | 1.3035E+00 | −1.3638E+01 |
| A10= | 1.8397E+01 | 7.1266E+00 | −2.7305E+01 | −8.4364E−01 | 3.2077E+01 |
| A12= | −1.2869E+01 | −3.9218E+00 | 7.5252E+01 | −1.5880E+00 | −3.7264E+01 |
| A14= | — | 2.2838E−01 | −9.5120E+01 | 1.0926E+00 | 2.0710E+01 |
| A16= | — | — | 4.5098E+01 | — | −4.4645E+00 |

| Surface # | 12 | 13 | 14 | 15 |
|---|---|---|---|---|
| k= | −1.1600E+01 | −8.8769E+00 | −8.3128E+00 | −4.0280E+00 |
| A4= | 5.7505E−01 | 2.1744E+00 | 4.4082E−01 | 2.5885E−01 |
| A6= | 1.6167E+00 | −4.2893E+00 | −9.1383E−01 | −7.4047E−01 |
| A8= | −7.1985E+00 | 4.3675E+00 | 3.3420E−01 | 6.8697E−01 |
| A10= | 1.0730E+01 | −2.6519E+00 | 1.4081E−01 | −3.5540E−01 |
| A12= | −8.2797E+00 | 9.4434E−01 | −1.2814E−01 | 1.0304E−01 |
| A14= | 3.2329E+00 | −1.7964E−01 | 3.2381E−02 | −1.5324E−02 |
| A16= | −4.9873E−01 | 1.3904E−02 | −2.8357E−03 | 9.0145E−04 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 1.40 | |R14/R3| | 0.0035 |
| Fno | 1.98 | |R14/R4| | 0.15 |
| HFOV [deg.] | 60.5 | |R14/R5| | 0.04 |
| FOV [deg.] | 121.0 | |R14/R6| | 0.02 |
| V20 | 3 | |R14/R7| | 0.03 |
| TL/ImgH | 1.54 | |R14/R8| | 0.41 |
| Td/|Y72| | 1.44 | |R14/R9| | 0.38 |
| |Y11/Y72| | 0.70 | |R14/R10| | 0.41 |
| |Y11/Ystop| | 3.80 | |R14/R11| | 0.65 |
| |Y72|/f | 1.36 | |R14/R12| | 0.38 |
| |Yc62/Yc72| | 0.97 | |R14/R13| | 0.79 |
| |Yc_55|/ImgH | 0.71 | R14/|Y72| | 0.13 |
| |R14/R1| | 0.0026 | f/R12 | −2.16 |
| |R14/R2| | 0.01 | |f/f1| + |f/f2| | 0.53 |

7th Embodiment

Figure 13:
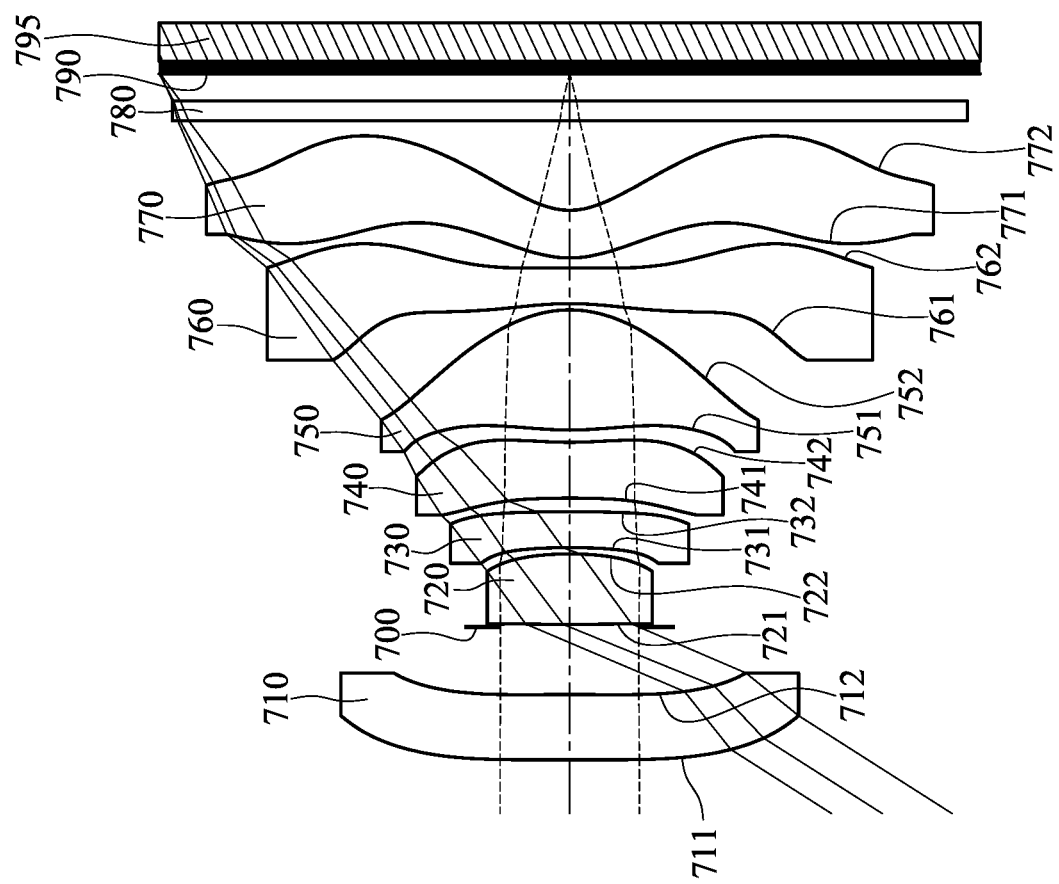
FIG. 13 is a schematic view of an image capturing unit according to the 7th embodiment of the present disclosure.
Figure 14:
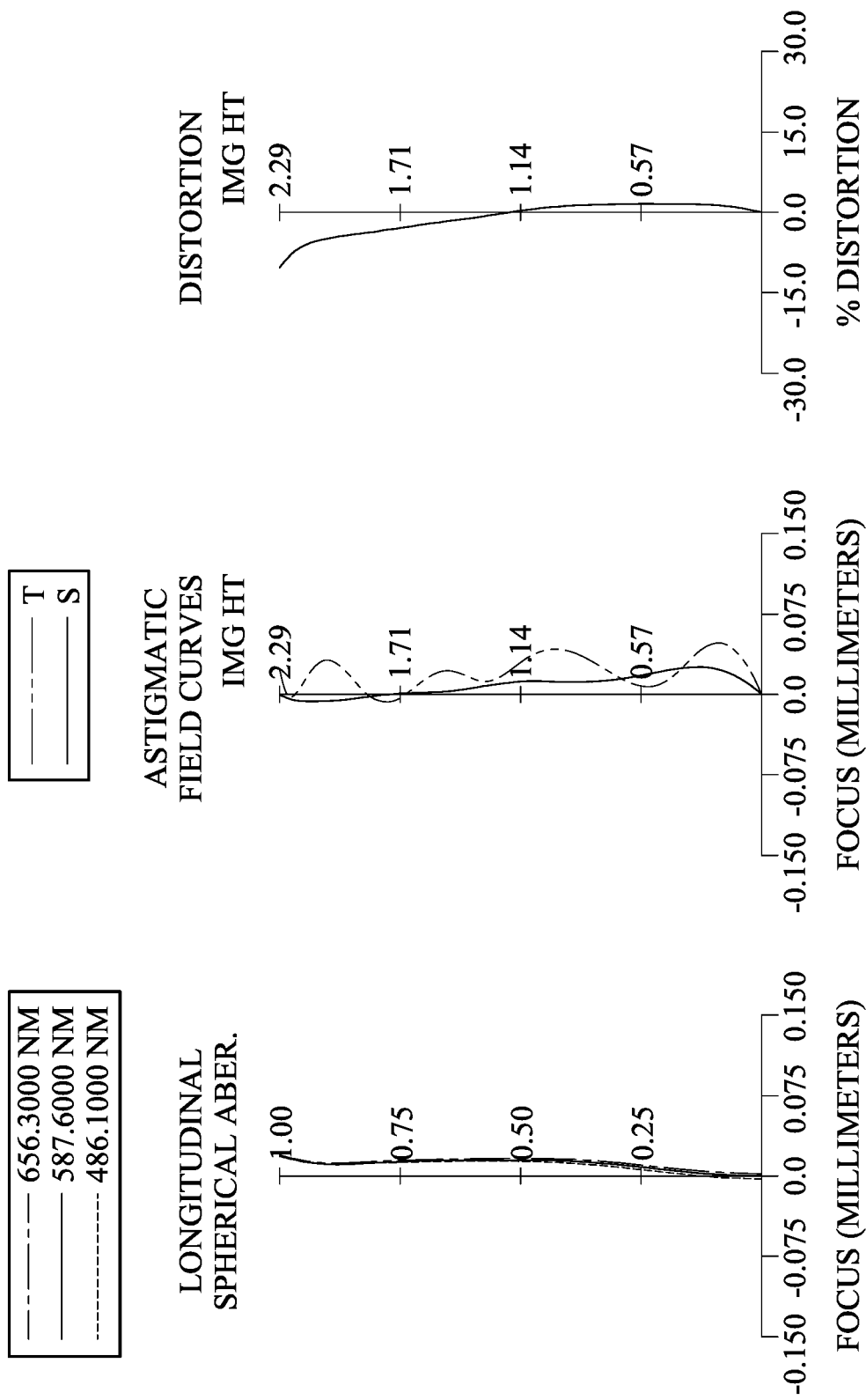
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical imaging lens assembly (its reference numeral is omitted) of the present disclosure and an image sensor 795. The optical imaging lens assembly includes, in order from an object side to an image side, a first lens element 710, an aperture stop 700, a second lens element 720, a third lens element 730, a fourth lens element 740, a fifth lens element 750, a sixth lens element 760, a seventh lens element 770, an IR-cut filter 780 and an image surface 790. The optical imaging lens assembly includes seven lens elements (710, 720, 730, 740, 750, 760 and 770) with no additional lens element disposed between each of the adjacent seven lens elements.

The first lens element 710 with positive refractive power has an object-side surface 711 being concave in a paraxial region thereof and an image-side surface 712 being convex in a paraxial region thereof. The first lens element 710 is made of plastic material and has the object-side surface 711 and the image-side surface 712 being both aspheric.

The second lens element 720 with positive refractive power has an object-side surface 721 being convex in a paraxial region thereof and an image-side surface 722 being convex in a paraxial region thereof. The second lens element 720 is made of plastic material and has the object-side surface 721 and the image-side surface 722 being both aspheric.

The third lens element 730 with negative refractive power has an object-side surface 731 being concave in a paraxial region thereof and an image-side surface 732 being convex in a paraxial region thereof. The third lens element 730 is made of plastic material and has the object-side surface 731 and the image-side surface 732 being both aspheric.

The fourth lens element 740 with negative refractive power has an object-side surface 741 being concave in a paraxial region thereof and an image-side surface 742 being concave in a paraxial region thereof. The fourth lens element 740 is made of plastic material and has the object-side surface 741 and the image-side surface 742 being both aspheric.

The fifth lens element 750 with positive refractive power has an object-side surface 751 being convex in a paraxial region thereof and an image-side surface 752 being convex in a paraxial region thereof. The fifth lens element 750 is made of plastic material and has the object-side surface 751 and the image-side surface 752 being both aspheric.

The sixth lens element 760 with negative refractive power has an object-side surface 761 being concave in a paraxial region thereof and an image-side surface 762 being convex in a paraxial region thereof. The sixth lens element 760 is made of plastic material and has the object-side surface 761 and the image-side surface 762 being both aspheric.

The seventh lens element 770 with negative refractive power has an object-side surface 771 being convex in a paraxial region thereof and an image-side surface 772 being concave in a paraxial region thereof. The seventh lens element 770 is made of plastic material and has the object-side surface 771 and the image-side surface 772 being both aspheric. Each of the object-side surface 771 and the image-side surface 772 of the seventh lens element 770 has at least one critical point in an off-axis region thereof.

The IR-cut filter 780 is made of glass material and located between the seventh lens element 770 and the image surface 790, and will not affect the focal length of the optical imaging lens assembly. The image sensor 795 is disposed on or near the image surface 790 of the optical imaging lens assembly.

The detailed optical data of the 7th embodiment are shown in Table 13 and the aspheric surface data are shown in Table 14 below.

TABLE 13

7th Embodiment
f = 1.63 mm, Fno = 2.10, HFOV = 57.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −69.662 | (ASP) | 0.364 | Plastic | 1.669 | 19.5 | 34.45 |
| 2 | | −17.351 | (ASP) | 0.376 | | | | |
| 3 | Ape. Stop | Plano | | 0.015 | | | | |
| 4 | Lens 2 | 12.420 | (ASP) | 0.393 | Plastic | 1.544 | 56.0 | 2.95 |
| 5 | | −1.823 | (ASP) | 0.035 | | | | |
| 6 | Lens 3 | −3.912 | (ASP) | 0.200 | Plastic | 1.614 | 26.0 | −9.30 |
| 7 | | −12.659 | (ASP) | 0.076 | | | | |
| 8 | Lens 4 | −7.051 | (ASP) | 0.311 | Plastic | 1.544 | 56.0 | −3.01 |
| 9 | | 2.168 | (ASP) | 0.069 | | | | |
| 10 | Lens 5 | 1.872 | (ASP) | 0.670 | Plastic | 1.544 | 56.0 | 0.99 |
| 11 | | −0.660 | (ASP) | 0.035 | | | | |
| 12 | Lens 6 | −1.716 | (ASP) | 0.200 | Plastic | 1.669 | 19.5 | −3.42 |
| 13 | | −7.193 | (ASP) | 0.054 | | | | |
| 14 | Lens 7 | 0.585 | (ASP) | 0.266 | Plastic | 1.544 | 56.0 | −3.56 |
| 15 | | 0.377 | (ASP) | 0.500 | | | | |
| 16 | IR-cut filter | Plano | | 0.110 | Glass | 1.517 | 64.2 | — |
| 17 | | Plano | | 0.151 | | | | |
| 18 | Image | Plano | | — | | | | |

Note:
Reference wavelength is 587.6 nm (d-line).
An effective radius of the image-side surface 752 (Surface 11) is 1.050 mm.

TABLE 14

| Aspheric Coefficients | | | | | |
|---|---|---|---|---|---|
| Surface # | 1 | 2 | 4 | 5 | 6 |
| k= | −7.7835E+01 | −9.0000E+01 | −4.5499E+01 | −7.0638E+00 | −3.8470E+01 |
| A4= | 1.1541E−01 | 2.0691E−01 | −1.9649E−01 | −9.2569E−01 | −6.5684E−01 |
| A6= | −2.8682E−02 | −1.2096E−01 | 2.0821E+00 | 4.1639E+00 | 3.3676E+00 |
| A8= | 6.9104E−03 | 7.5650E−02 | −3.2339E+01 | −4.2375E+01 | −3.9050E+01 |
| A10= | 2.4623E−03 | −3.4412E−03 | 1.9215E+02 | 1.4555E+02 | 1.2010E+02 |
| A12= | — | — | −4.9703E+02 | −2.1537E+02 | −1.6726E+02 |

| Surface # | 7 | 8 | 9 | 10 | 11 |
|---|---|---|---|---|---|
| k= | −9.0000E+01 | −8.7525E+00 | −2.9896E+01 | −5.0703E+01 | −1.9948E+00 |
| A4= | −1.9086E−01 | −5.7811E−01 | −1.1295E+00 | −3.4814E−01 | −4.2946E−01 |
| A6= | 1.0295E+00 | 2.7543E−01 | 4.1793E+00 | 7.8292E−01 | 2.2319E+00 |
| A8= | −7.0457E+00 | 2.1262E+00 | −1.5372E+01 | −3.9861E+00 | −8.2400E+00 |
| A10= | 1.4395E+01 | −3.4974E+00 | 2.9527E+01 | 8.8468E+00 | 1.6894E+01 |
| A12= | −1.0493E+01 | 1.6517E+00 | −2.5077E+01 | −8.4173E+00 | −1.8754E+01 |
| A14= | — | 1.9817E−01 | 2.7908E+00 | 2.7545E+00 | 1.0741E+01 |
| A16= | — | — | 5.1520E+00 | — | −2.4888E+00 |

| Surface # | 12 | 13 | 14 | 15 |
|---|---|---|---|---|
| k= | −2.0946E+00 | −6.6514E+01 | −5.0582E+00 | −2.6518E+00 |
| A4= | 7.9370E−01 | 6.4087E−01 | −1.6754E−01 | −3.0416E−01 |
| A6= | −1.4987E+00 | −8.1679E−01 | −1.6091E−01 | 1.9775E−01 |
| A8= | 2.0576E+00 | 5.1311E−01 | 2.2026E−01 | −9.2470E−02 |
| A10= | −1.9020E+00 | −2.0726E−01 | −1.0102E−01 | 2.0536E−02 |
| A12= | 9.0271E−01 | 5.5738E−02 | 2.3672E−02 | −3.7109E−04 |
| A14= | −1.7520E−01 | −9.0282E−03 | −2.8599E−03 | −4.8428E−04 |
| A16= | 5.9888E−03 | 6.5831E−04 | 1.4066E−04 | 4.7480E−05 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 1.63 | |R14/R3| | 0.03 |
| Fno | 2.10 | |R14/R4| | 0.21 |
| HFOV [deg.] | 57.5 | |R14/R5| | 0.10 |
| FOV [deg.] | 115.0 | |R14/R6| | 0.03 |
| V20 | 2 | |R14/R7| | 0.05 |
| TL/ImgH | 1.67 | |R14/R8| | 0.17 |
| Td/|Y72| | 1.51 | |R14/R9| | 0.20 |
| |Y11/Y72| | 0.63 | |R14/R10| | 0.57 |
| |Y11/Ystop| | 3.31 | |R14/R11| | 0.22 |
| |Y72|/f | 1.24 | |R14/R12| | 0.05 |
| |Yc62/Yc72| | 1.00 | |R14/R13| | 0.64 |
| |Yc_55|/ImgH | 0.80 | R14/|Y72| | 0.19 |
| |R14/R1| | 0.01 | f/R12 | −0.23 |
| |R14/R2| | 0.02 | |f/f1| + |f/f2| | 0.60 |

8th Embodiment

Figure 15:
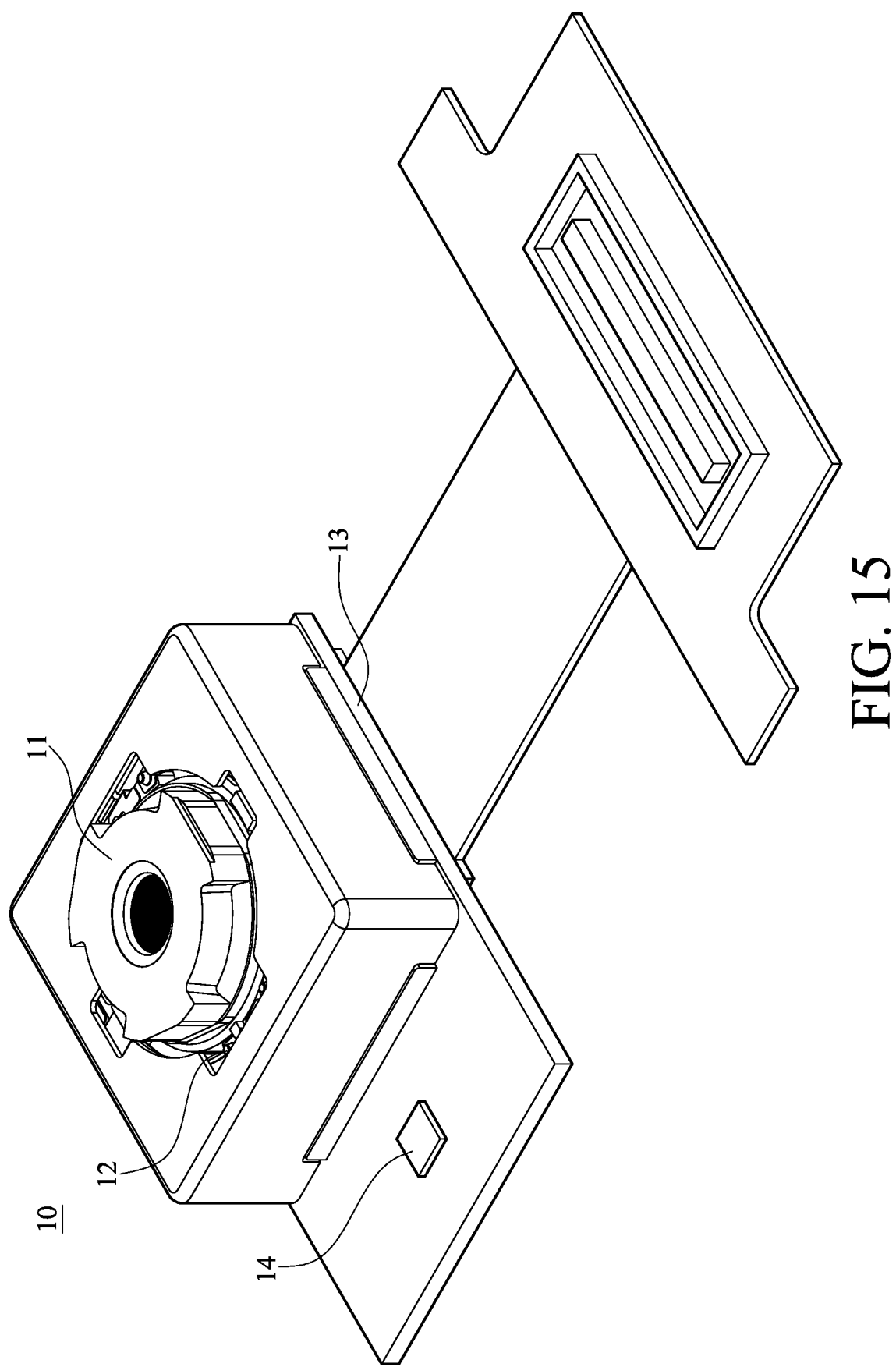
FIG. 15 is a perspective view of an image capturing unit according to the 8th embodiment of the present disclosure.

FIG. 15 is a perspective view of an image capturing unit according to the 8th embodiment of the present disclosure. In this embodiment, an image capturing unit 10 is a camera module including a lens unit 11, a driving device 12, an image sensor 13 and an image stabilizer 14. The lens unit 11 includes the optical imaging lens assembly disclosed in the 1st embodiment, a barrel and a holder member (their reference numerals are omitted) for holding the optical imaging lens assembly. The imaging light converges in the lens unit 11 of the image capturing unit 10 to generate an image while utilizing the driving device 12 for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the optical imaging lens assembly to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving the image quality while in motion or low-light conditions.

9th Embodiment

Figure 16:
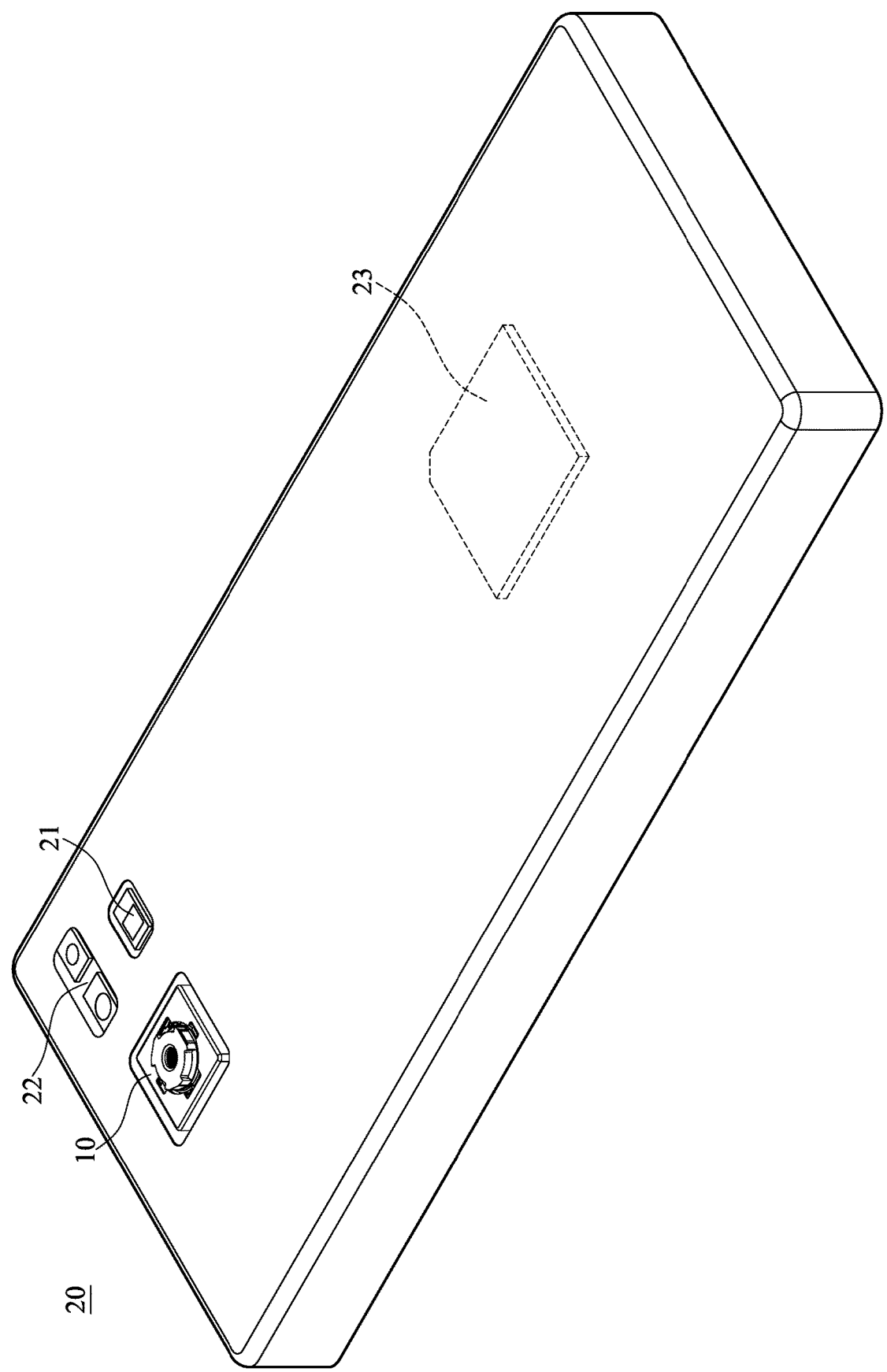
FIG. 16 is one perspective view of an electronic device according to the 9th embodiment of the present disclosure.
Figure 17:
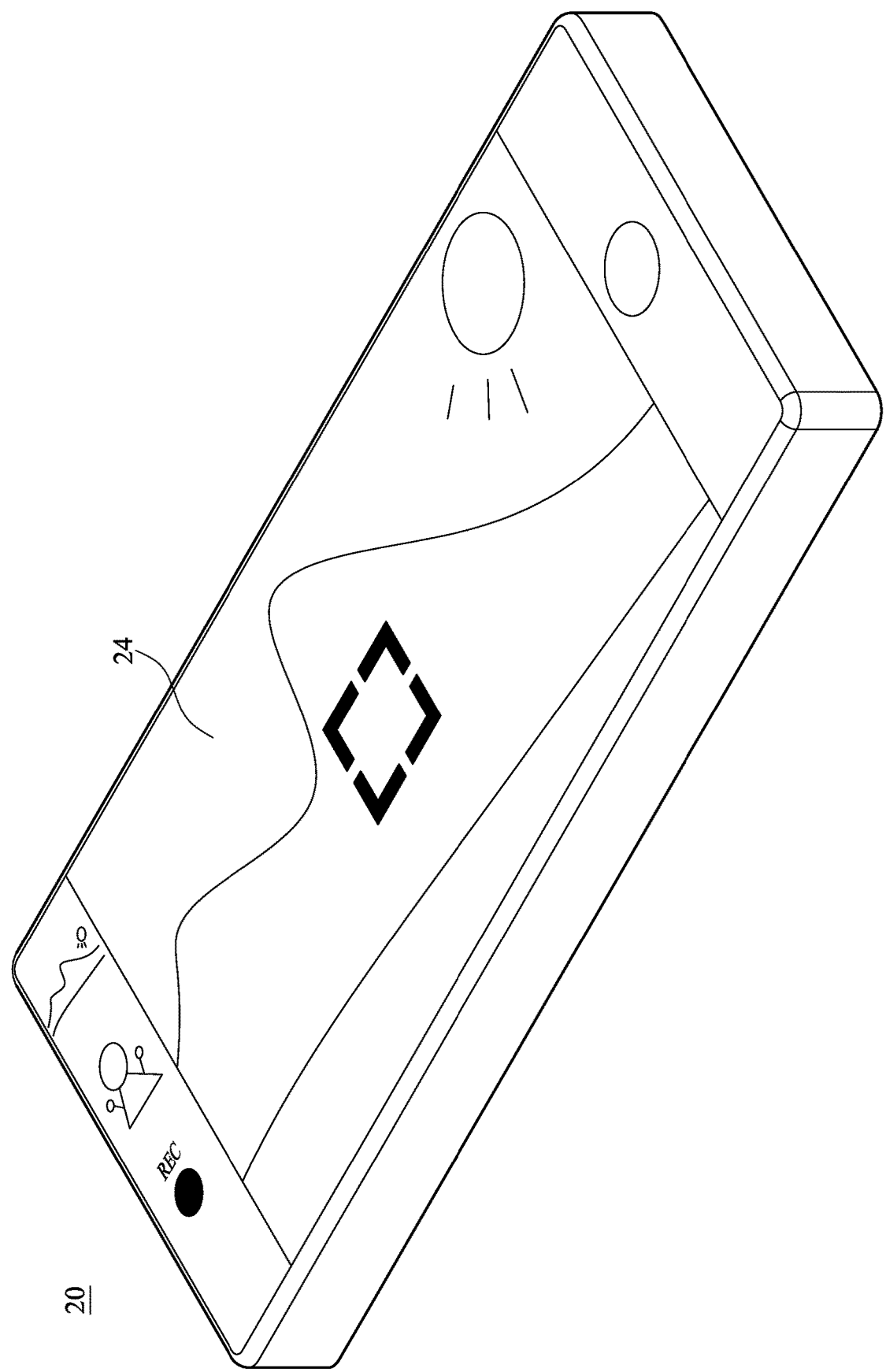
FIG. 17 is another perspective view of the electronic device in FIG. 16.
Figure 18:
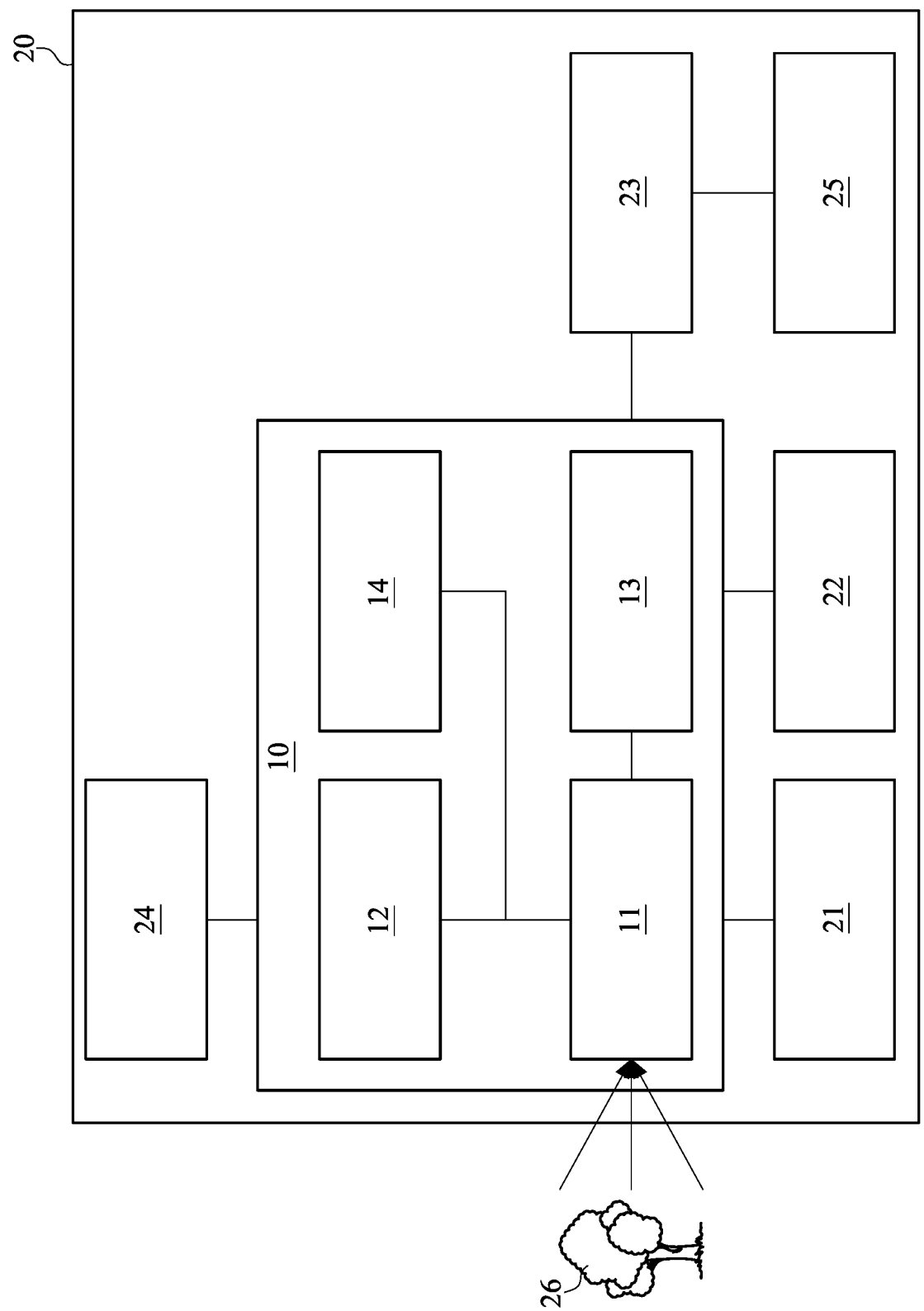
FIG. 18 is a block diagram of the electronic device in FIG. 16.

FIG. 16 is one perspective view of an electronic device according to the 9th embodiment of the present disclosure. FIG. 17 is another perspective view of the electronic device in FIG. 16. FIG. 18 is a block diagram of the electronic device in FIG. 16. In this embodiment, an electronic device 20 is a smartphone including the image capturing unit 10 disclosed in the 8th embodiment, a flash module 21, a focus assist module 22, an image signal processor 23, a user interface 24 and an image software processor 25. In this embodiment, the electronic device 20 includes one image capturing unit 10, but the disclosure is not limited thereto. In some cases, the electronic device 20 can include multiple image capturing units 10, or the electronic device 20 further includes another different image capturing unit.

When a user captures images of an object 26 through the user interface 24, the light rays converge in the image capturing unit 10 to generate an image, and the flash module 21 is activated for light supplement. The focus assist module 22 detects the object distance of the imaged object 26 to achieve fast auto focusing.

The image signal processor 23 is configured to optimize the captured image to improve the image quality. The light beam emitted from the focus assist module 22 can be either conventional infrared or laser. The user interface 24 can be a touch screen or a physical button. The user is able to interact with the user interface 24 and the image software processor 25 having multiple functions to capture images and complete image processing.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the optical imaging lens assembly of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-14 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens assembly comprising seven lens elements, the seven lens elements being, in order from an object side to an image side, a first lens element, a second lens element, a third lens element, a fourth lens element, a fifth lens element, a sixth lens element and a seventh lens element, wherein the seventh lens element has an image-side surface being concave in a paraxial region thereof, at least one of an object-side surface and the image-side surface of the seventh lens element has at least one critical point in an off-axis region thereof, the object-side surface and the image-side surface of the seventh lens element are both aspheric;

wherein an axial distance between an object-side surface of the first lens element and the image-side surface of the seventh lens element is Td, a maximum effective radius of the image-side surface of the seventh lens element is Y72, a chief ray with an incident angle of 55 degrees relative to an optical axis is CR, an intersection point between CR and the image-side surface of the seventh lens element is P, a vertical distance from the optical axis to P is Yc_55, a maximum image height of the optical imaging lens assembly is ImgH, and the following conditions are satisfied:

$Td/|Y72|<1.80$; and $0.30<|Yc\_55|/ImgH<0.95$.

2. The optical imaging lens assembly of claim 1, wherein an axial distance between the object-side surface of the first lens element and an image surface is TL, the maximum image height of the optical imaging lens assembly is ImgH, a maximum field of view of the optical imaging lens assembly is FOV, an f-number of the optical imaging lens assembly is Fno, and the following conditions are satisfied:

$TL/ImgH<2.0$;

$110 \text{ [deg.]}<FOV<220 \text{ [deg.]}$; and $1.0<Fno<2.40$.

3. The optical imaging lens assembly of claim 1, wherein a maximum effective radius of the object-side surface of the first lens element is Y11, the maximum effective radius of the image-side surface of the seventh lens element is Y72, and the following condition is satisfied:

$|Y11/Y72|<1.20$.

4. The optical imaging lens assembly of claim 3, wherein the maximum effective radius of the object-side surface of the first lens element is Y11, the maximum effective radius of the image-side surface of the seventh lens element is Y72, and the following condition is satisfied:

$|Y11/Y72|<0.90$.

5. The optical imaging lens assembly of claim 1, wherein the seventh lens element has negative refractive power.

6. The optical imaging lens assembly of claim 1, wherein the first lens element has negative refractive power.

7. The optical imaging lens assembly of claim 1, wherein a focal length of the optical imaging lens assembly is f, a focal length of the first lens element is f1, a focal length of the second lens element is f2, and the following condition is satisfied:

$|f/f1|+|f/f2|<0.70$.

8. The optical imaging lens assembly of claim 1, wherein a curvature radius of the object-side surface of the first lens element is R1, a curvature radius of an image-side surface of the first lens element is R2, a curvature radius of an object-side surface of the second lens element is R3, a curvature radius of an image-side surface of the second lens element is R4, a curvature radius of an object-side surface of the third lens element is R5, a curvature radius of an image-side surface of the third lens element is R6, a curvature radius of an object-side surface of the fourth lens element is R7, a curvature radius of an image-side surface of the fourth lens element is R8, a curvature radius of an object-side surface of the fifth lens element is R9, a curvature radius of an image-side surface of the fifth lens element is R10, a curvature radius of an object-side surface of the sixth lens element is R11, a curvature radius of an image-side surface of the sixth lens element is R12, a curvature radius of the object-side surface of the seventh lens element is R13, a curvature radius of the image-side surface of the seventh lens element is R14, and the following conditions are satisfied:

$|R14/R1|<1.0;$ $|R14/R2|<1.0;$ $|R14/R3|<1.0;$ $|R14/R4|<1.0;$ $|R14/R5|<1.0;$ $|R14/R6|<1.0;$ $|R14/R7|<1.0;$ $|R14/R8|<1.0;$ $|R14/R9|<1.0;$ $|R14/R10|<1.0;$ $|R14/R11|<0.0;$ $|R14/R12|<1.0;$ and $|R14/R13|<0.0.$ 9. The optical imaging lens assembly of claim 1, wherein a vertical distance between a convex critical point closest to a maximum effective radius position on an image-side surface of the sixth lens element and the optical axis is Yc62, a vertical distance between a convex critical point closest to a maximum effective radius position on the image-side surface of the seventh lens element and the optical axis is Yc72, and the following condition is satisfied:

$0.50<|Yc62/Yc72|<1.5.$

10. The optical imaging lens assembly of claim 1, further comprising an aperture stop disposed between an imaged object and an object-side surface of the third lens element.

11. The optical imaging lens assembly of claim 1, wherein the sixth lens element is meniscus in a paraxial region thereof.

12. The optical imaging lens assembly of claim 1, wherein a number of lens elements having an Abbe number smaller than 20 among the seven lens elements is V20, and the following condition is satisfied:

$2 \leq V20.$

13. The optical imaging lens assembly of claim 1, wherein a focal length of the optical imaging lens assembly is f, a curvature radius of an image-side surface of the sixth lens element is R12, and the following condition is satisfied:

$0 \leq f/R12.$

14. The optical imaging lens assembly of claim 1, wherein the maximum effective radius of the image-side surface of the seventh lens element is Y72, a focal length of the optical imaging lens assembly is f, and the following condition is satisfied:

$1.0<|Y72|/f.$

15. The optical imaging lens assembly of claim 1, wherein the axial distance between the object-side surface of the first lens element and the image-side surface of the seventh lens element is Td, the maximum effective radius of the image-side surface of the seventh lens element is Y72, and the following condition is satisfied:

$1.0<Td/|Y72|<1.60.$

16. The optical imaging lens assembly of claim 1, wherein the object-side surface of the seventh lens element is convex in a paraxial region thereof.

17. The optical imaging lens assembly of claim 1, wherein the fourth lens element has negative refractive power.

18. The optical imaging lens assembly of claim 1, further comprising an aperture stop, wherein a maximum effective radius of the object-side surface of the first lens element is Y11, an aperture radius of the aperture stop is Ystop, and the following condition is satisfied:

$|Y11/Ystop|<2.0.$

19. The optical imaging lens assembly of claim 1, wherein the fifth lens element has an image-side surface being convex in a paraxial region thereof.

20. The optical imaging lens assembly of claim 1, wherein a curvature radius of the image-side surface of the seventh lens element is R14, the maximum effective radius of the image-side surface of the seventh lens element is Y72, and the following condition is satisfied:

$0<R14/|Y72|<0.50.$

21. An image capturing unit, comprising:
the optical imaging lens assembly of claim 1; and
an image sensor disposed on an image surface of the optical imaging lens assembly.

22. An electronic device, comprising:
the image capturing unit of claim 21.

* * * * *